US006665701B1

(12) United States Patent
Combs et al.

(10) Patent No.: US 6,665,701 B1
(45) Date of Patent: Dec. 16, 2003

(54) METHOD AND SYSTEM FOR CONTENTION CONTROLLED DATA EXCHANGE IN A DISTRIBUTED NETWORK-BASED RESOURCE ALLOCATION

(75) Inventors: Charles Combs, Las Cruces, NM (US); Jeffrey Gold, Stamford, CT (US); Brian Mair, New Canaan, CT (US); David Pedersen, Monument, CO (US); David Schear, Oradell, NJ (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/365,635

(22) Filed: Aug. 3, 1999

(51) Int. Cl.[7] ............................. G06F 9/00; G06F 15/16; G06F 15/173
(52) U.S. Cl. ....................... 709/104; 709/200; 709/223; 709/229
(58) Field of Search ............................... 709/100, 218, 709/245, 102, 104, 200, 223, 226, 229; 370/329, 395.4

(56) References Cited

U.S. PATENT DOCUMENTS

| | | | | | |
|---|---|---|---|---|---|
| 5,115,430 A | * | 5/1992 | Hahne et al. | ................ | 370/440 |
| 5,220,674 A | * | 6/1993 | Morgan et al. | ............. | 709/223 |
| 5,276,899 A | * | 1/1994 | Neches | ........................ | 709/103 |
| 5,493,569 A | * | 2/1996 | Buchholz et al. | ............. | 706/49 |
| 5,617,545 A | * | 4/1997 | Ogata et al. | ................ | 709/227 |
| 5,926,458 A | * | 7/1999 | Yin | ............................. | 370/230 |
| 5,944,792 A | * | 8/1999 | Yamato et al. | .............. | 709/219 |
| 6,181,684 B1 | * | 1/2001 | Turcotte et al. | ............. | 370/232 |
| 6,192,250 B1 | * | 2/2001 | Buskens et al. | ............. | 455/433 |
| 6,219,669 B1 | * | 4/2001 | Haff et al. | ..................... | 707/10 |
| 6,347,312 B1 | * | 2/2002 | Byrne et al. | ................ | 709/218 |
| 6,353,608 B1 | * | 3/2002 | Cullers et al. | .............. | 348/699 |

* cited by examiner

*Primary Examiner*—David Wiley
*Assistant Examiner*—Joseph E Avellino

(57) ABSTRACT

A method and system for resolving contending requests for resources connected from a computer network by application programs running on computers attached to the communications network. The distributed resource allocator system comprises a number of identical processes running on one or more computers attached to the communications network. Application programs request allocation of resources from a local distributed resource allocator system process running using a resource allocator applications programming interface. Application programs request allocation of resource from a remote distributed resource allocator system process via a resource allocator access protocol. Contending resource requests are first resolved by the priority of the resource request. If contention cannot be resolved by priority alone, then contentions are next resolved by examining the resource request's time of arrival in light of its priority. The system allows quality of service time-outs for requests that cannot be timely processed. A resource request returned due to a quality of service time-out may be resubmitting having its original time of arrival.

51 Claims, 20 Drawing Sheets

| Operation | Description | Invoker | Performer |
|---|---|---|---|
| Bind | Begin a session | RA User | RAHS |
| Unbind | End a session | RA User | RAHS |
| Register-Resource | Add resource to resource database | RA User | RAHS |
| Unregister-Resource | Removes a resource from the resource database | RA User | RAHS |
| Begin-Allocating-Resource | Begin allocation of a resource | RA User | RAHS |
| Stop-Allocating-Resource | Terminates the allocation of a resource | RA User | RAHS |
| Allocate-Resource | Perform resource allocation function | RA User | RAHS |
| Set-Current-Capacity | Sets remaining capacity of an allocatable resource | RA User | RAHS |
| Deallocate-Resource | Releases an allocated resource | RA User | RAHS |
| Schedule-Task | Schedules a task to be performed by a resource | RA User | RAHS |
| Perform-Task | Instructs a resource to perform a scheduled task | RAHS | RA User |
| Provide-Next-Task | Allows a resource to request the next task of a series | RA User | RAHS |

FIG. 11

METHOD AND SYSTEM FOR CONTENTION CONTROLLED DATA EXCHANGE IN A DISTRIBUTED NETWORK-BASED RESOURCE ALLOCATION

TECHNICAL FIELD

The present invention relates to communications networks and, in particular, to the exchange of data between users of computational resources connected to a communications network and a distributed resource allocator handling system that manages the use of those computational resources, including resolving contending requests for use of the computational resources.

BACKGROUND OF THE INVENTION

A typical communications network comprises a number of computers and other electronic devices interconnected by a data transmission network. Data transmission networks include public switched telephone networks (PSTNs), ATM networks, internal intranets, the Internet and private networks implemented using any of a large number of available software and hardware components. Commonly, a computer is connected to a physical data transmission network through one or more physical ports, each port having a unique network address. Additional types of electronic devices may also be directly connected to a physical data transmission network or may be accessed from the physical data transmission network through an intermediate computer to which the electronic devices are attached. These additional electronic devices include modems, printers, switchboards, and audio response units.

Each computer attached to the network can execute one or more software programs. An instance of a running program is called a process. A person using a general purpose computer normally launches the execution of application programs. Application programs include word processing programs, web browsers, spread sheets, and computer games. Such programs will be called "users" in the following discussion. Application programs can, in turn, request and make use of operating system services provided by concurrently executing operating system programs. These services include the transfer of data from one general purpose computer to another over a physical data transmission network. The data may be transferred to another application program running on a remote computer or to a peripheral device such as a modem or a printer. An application program may also initiate execution of a program on a remote computer, transmit data to that program, and receive data back from that program over a physical data transmission network. The electronic devices, including computers, that a user may directly request services from, either directly or indirectly through operating system calls, are commonly referred to as computer resources.

FIG. 1 represents a schematic diagram of a simple communications network. The physical data transmission network 101 is represented as a central spoke and hub feature connecting the remaining elements in the diagram. These remaining elements include computers 102–106, users 107–110, and resources 112–118. One resource 112 is connected directly to the physical data transmission network. Resources 113–118 are indirectly connected to the network through computers. Tasks 111, 119, and 120 are processes running on a multi-tasking computer. Each task is launched by a user. The capacity of this multi-tasking computer 106 to run processes is considered a resource. Resources 112–118 represent printers, modems, switchboards, or other electronic devices.

A communications network, like the network displayed in FIG. 1, provides the potential for a user running on one computer to exchange data with, and request services from, remote resources connected to the network. For example, suppose computer 102 in FIG. 1 represents a personal computer running a software application program corresponding to user 107. Resource 113, which is attached directly to this personal computer, represents a black and white laser printer. Resource 114, which is directly connected to computer 104, represents a color printer. Suppose that user 107 has been directed to print out a color diagram. In order to print the color diagram, user 107 must send to computer 104, through the physical data transmission network, a file representing the diagram to be printed and a request that that file be printed out by the color printer 114.

Even in a simple communications network, like the one displayed in FIG. 1, attempts by several users to simultaneously access remote resources can lead to a number of problems. Continuing with the above example, suppose user 109 running on computer 106 has also been directed to print a color diagram, and user 109 sends a request to computer 104 to print the color diagram on color printer 114 at about the same time as user 107 sends its request. In such a case, users 107 and 109 are said to contend for resource 114. Some resources, such as color printer 114, contain a queuing mechanism that resolves such contentions by queuing the requests in the order that they arrive. This means, however, that if user 107 made its request slightly ahead of user 109, user 109 must wait until the request made by user 107 has been completed. Forcing user 109 to wait until user 107 relinquishes printer 114 may adversely affect user 109's expected quality of service. For example, user 109 may be forced to wait for an extremely long period of time before having the request processed.

Suppose further that resource 112 is a high speed modem without a sophisticated queuing mechanism, and suppose users 108 and 110 have been simultaneously directed to transmit large data files using this modem to a remote computer accessible only over telephone lines. In this case the consequences of contention may be quite severe, resulting in garbled transmission or the failure of one or both of the computers to transmit their files. Such contention also raises the same quality of service issues discussed above.

Suppose further that resource 112 is a bi-directional high speed modem that may be accessed by users from both inside and outside a computer network. Thus, if user 110 attempts to access the high speed modem 112 from outside the network while user 108 tries to access the modem from inside the network, then at least one of these users will not gain access to this modem. Under some circumstances, it may be preferable for user 110, the outside requester, to gain access to the modem 112 over user 108, regardless of the order in which their respective requests arrive. Such contention problems are nearly impossible to solve at the application program level. Users must know which resources are accessible via the network and which resources are currently busy with other tasks. This further implies that the users have essentially global information about the entire communications network and the resources therein. Such global information is dynamic rather than static. Printers can be turned on and off, for instance, or additional resources can be added to the network. It is far beyond the capability of application programs to acquire and maintain dynamic global network information. Even if a particular application program could be written to acquire and maintain dynamic global information, every other software application program would also need to be written with this capability. Such redundancy is prohibitively expensive and inefficient. In the example of high speed modem 112, both user 108 and user 110 would also need to be aware of each other and to constantly monitor the timing of each other's requests for modem 112.

SUMMARY OF THE INVENTION

The present invention provides a method and system for exchanging data between a user and a distributed resource allocator handling system that allocates computer resources connected to a communications network to users requesting those resources. The distributed resource allocator handling system comprises a number of resource allocator system agents, each running as a separate process on a computer connected to the network. Each resource allocator system agent maintains a database of global network resource information and constantly communicates with all other resource allocator system agents that comprise the distributed resource allocator handling system to ensure that each resource allocator system agent has the same global network information. A resource allocator system agent may be accessed directly by a user running on the same computer via an applications programming interface, or may be accessed by a user running on a remote computer via a communications protocol that provides the same functional interface as that provided by the applications programming interface. Resource allocator system agents communicate with each other using a different communications protocol. The elements of the resource allocator handling system provide an efficient mechanism for preventing contentions and conflicts based on the request priority and arrival time. Resolving contention based on request priority and arrival time resolves contending resource requests in a manner that minimizes the adverse impacts on the resource requesters' quality of service.

Aspects of the present invention also provide a method of contention resolution and conflict prevention across a plurality of resources in a distributed resource allocator handling system operating in a plurality of domains within a computer network. The method entails receiving a request for a resource. The contention resolution mechanism first determines if the resource request originates from within or outside the distributed resource allocator handling system. If the resource request originates from outside the distributed resource allocator handling system, then the contention control mechanism places the resource request at the beginning of a queue for the requested resource. If the resource request arises from within the distributed resource allocator handling system, then the contention control mechanism determines the priority associated with the resource request. The contention control mechanism then compares the resource request priority against the priorities of previously queued requests for the resource. If the resource request priority does not match the priority of a previously queued resource request, then the contention control mechanism inserts the resource request into the resource queue according to its priority. If the resource request matches the priority of at least one previously queued resource request, then the contention control mechanism queues the resource request according to both its priority and its time of arrival. If the resource request's priority and time of arrival both match a previously queued request priority and time of arrival then the contention control mechanism inserts the resource request in the resource's queue at a position following the previously queued resource having the same priority and time of arrival, according to one embodiment of the invention.

BRIEF DESCRIPTION OF THE DRAWINGS

A preferred embodiment of the present invention will be described below relative to the following figures.

FIG. 11 displays a high-level functional description of the resource allocator application programming interface as well as the resource allocation access protocol.

DETAILED DESCRIPTION OF THE INVENTION

The present invention provides a method and system both for exchanging function calls and data between a user and a distributed resource allocator handling system that allocates computer resources to users, as well as for exchanging data between components of the distributed resource allocator handling system. The distributed Resource Allocator Handling System ("RAHS") coordinates resource allocation among multiple users, balancing the workload assigned to similarly capable resources, resolving contentions between users, and acquiring and maintaining information about the capabilities of the distributed resources. Because the RAHS comprises a number of identical separate processes running on two or more computers, the RAHS can survive individual process and machine failures, thus providing fault-tolerant resource allocation.

Figure 1:
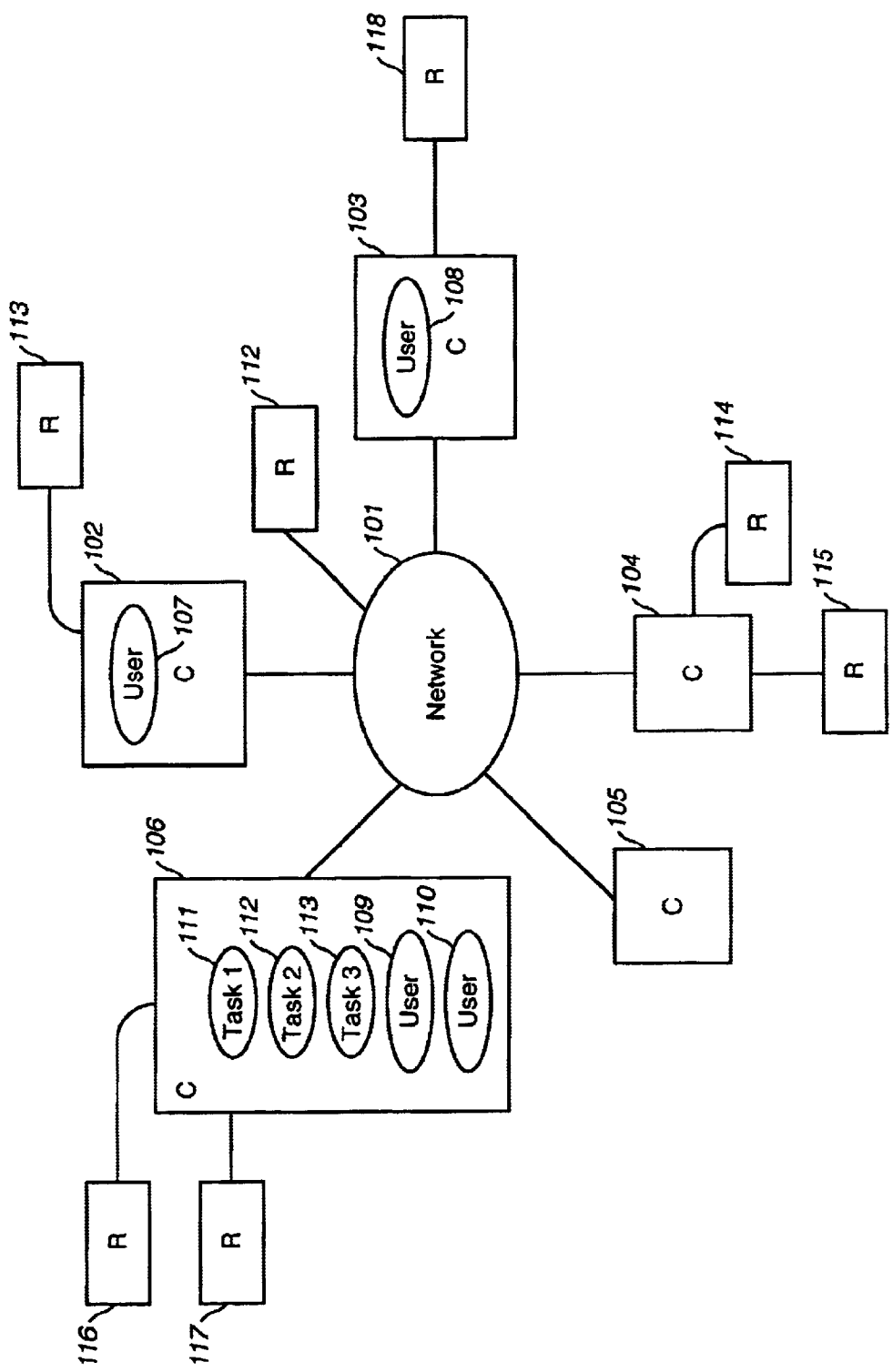
FIG. 1 displays a schematic diagram of a simple communications network.
Figure 2:
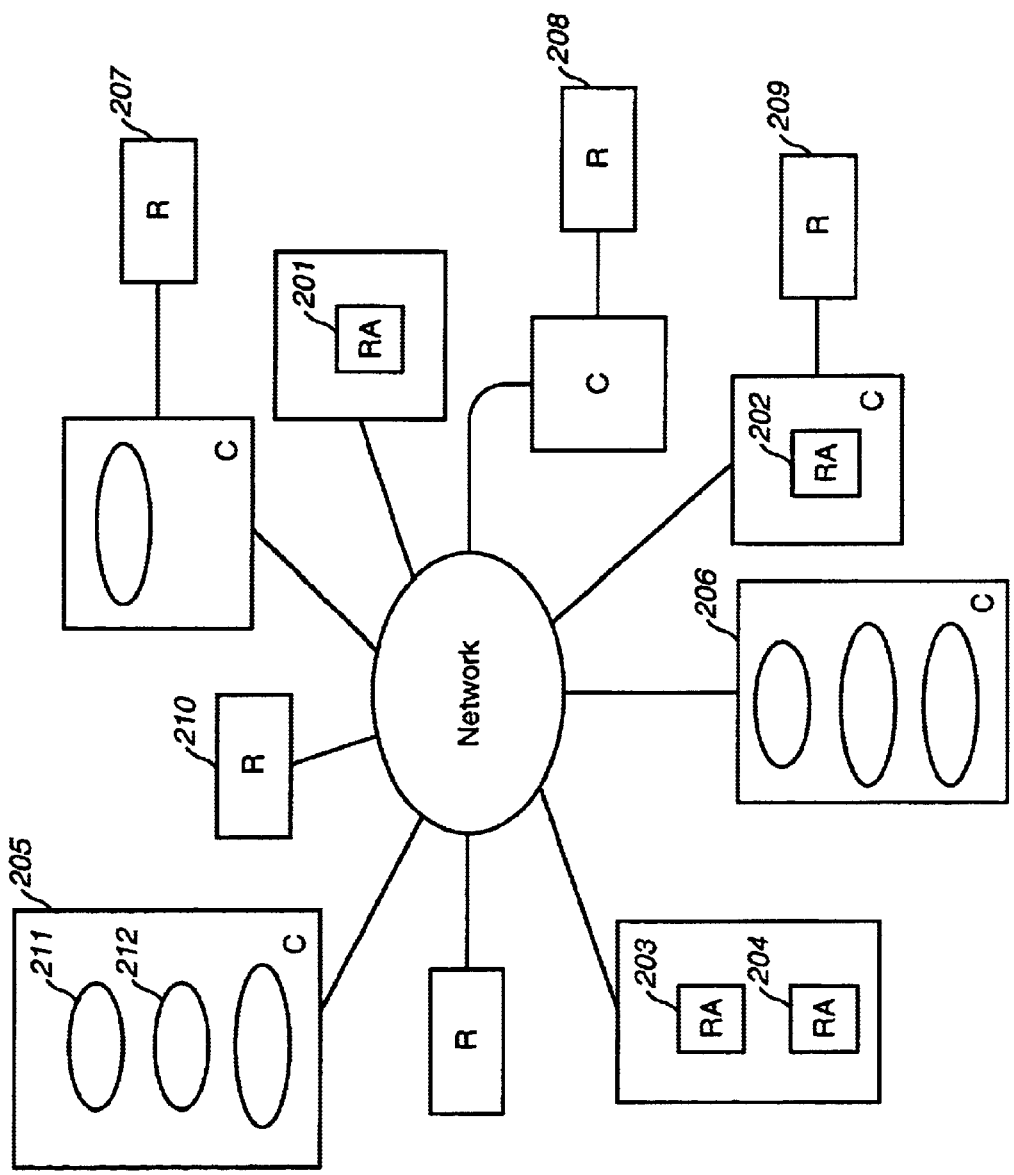
FIG. 2 displays the same communications network as displayed in FIG. 1 with the addition of the resource allocator handling system.

FIG. 2 displays a communications network, similar to the one displayed in FIG. 1, that comprises a RAHS. The RAHS comprises a number of resource allocator system agents ("RASAs") that run as separate processes on computers of the communications network. Four resource allocator system agents 201–204 are running on three of the computers of the network in FIG. 2. It is desirable to have two RASAs running on the same computer, exactly mirroring each other's operations, as in the case of RASAs 203 and 204. Failover is relatively easily and rapidly achieved in the case that one of the two co-located RASAs fails or encounters an error condition. However, co-located RASAs are not required for fault-tolerant operation. Any one of the RASAs can substitute for any other RASA running on the communications network.

There are three basic types of information exchange that occur in the context of a RAHS. Users must call functions provided by a resource allocator application programming interface ("RA-API") that are executed by a RASA in order to acquire, relinquish, and use computer resources. In the case that a user runs on a different computer than the RASA to which the function call is directed, the function call is packaged into a resource allocator access protocol ("RAAP") message for transport to the RASA that will execute the function call. Data returned to the user in response to the execution of the function call by the RASA is packaged into a return RAAP message and transported back to the user. Finally, each RASA maintains a global network information database ("GNID") that describes the state of the RAHS as a whole. When a RASA executes a function of the RA-API that causes the state of the RAHS to change, for example, a function that allocates a resource to a particular user, that RASA must inform the remaining RASAs of the RAHS that the resource has been allocated to the user, so that each of the remaining RASAs can appropriately update its GNID. The RASAs communicate among themselves using a resource allocator system protocol ("RASP"). The present invention thus comprises the RA-API, the RAAP, and the RASP.

The resources managed by the distributed resource allocator fall into two different categories. A resource may be either task-oriented or interaction-oriented. A task-oriented resource is a resource for which requests are queued and serviced by the resource one at a time. A printer is an example of a task-oriented resource. Each request to print a file is queued upon arrival at the printer. The printer retrieves requests one at a time from the queue and executes each request in its entirety before moving on to the next queued request. Once a user makes a request of the printer, no further interaction between the user and the printer is required. The user may simply wait until the task has been finished and acknowledged by the printer, or may, in some cases, proceed with other computing tasks while waiting for the acknowledgment.

Interaction-oriented resources, on the other hand, require continued communication between the user and the resource while the user's request is being serviced. An example of such an interaction-oriented resource is a modem. Typically, a user establishes a connection with a remote user through an initial request to the modem for a connection, and then engages in a dialog comprising a number of separate requests for transmitting data interleaved with reception of data from the remote user, followed finally by a request to terminate the connection.

Resources may be either simple or complex. Simple resources are single independent resources. Simple resources include ports, terminals, and modems. A complex resource is a collection of subordinate resources that are dependent on a common superior resource. A multitasking computer that is capable of running a number of separate processes is an example of a complex resource. Each process that runs on a multitasking computer is a subordinate resource, and the computer itself is the superior resource on which these subordinate resources depend. In FIG. 2, resources 207, 208, and 209 represent printers. These three resources are simple, task-oriented resources. Resource 210 represents a high-speed modem. Resource 210 is a simple interaction-oriented resource. The multitasking computers 205 and 206 in FIG. 2 represents complex task-oriented superior resources, and the tasks 211 and 212 running on computer 205 represent complex subordinate resources.

Figure 3:
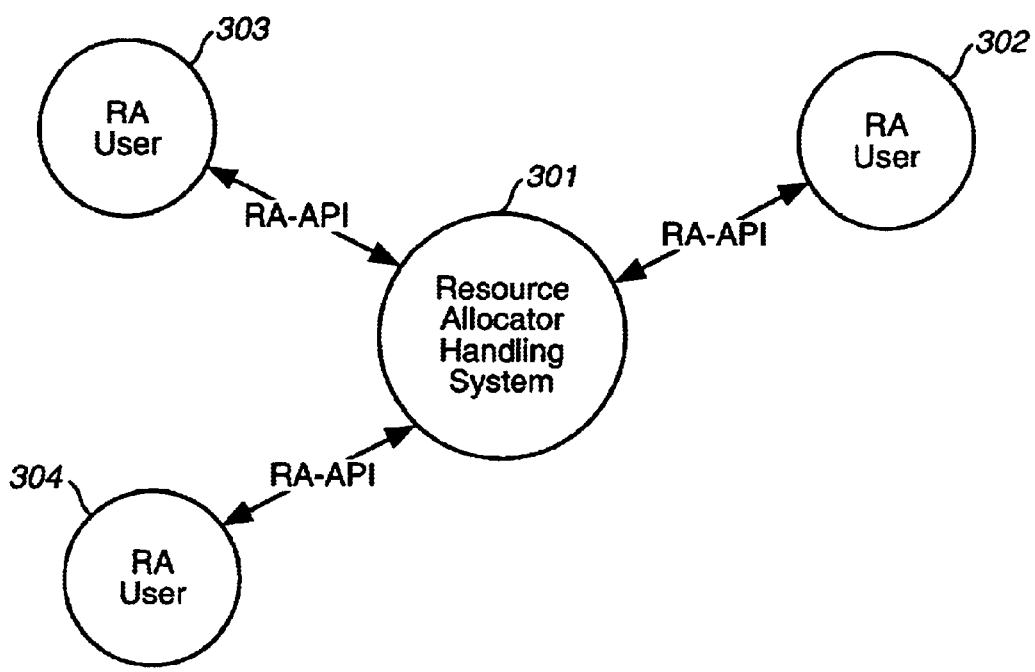
FIG. 3 displays the functional interface between users and the resource allocator handling system.
Figure 4:
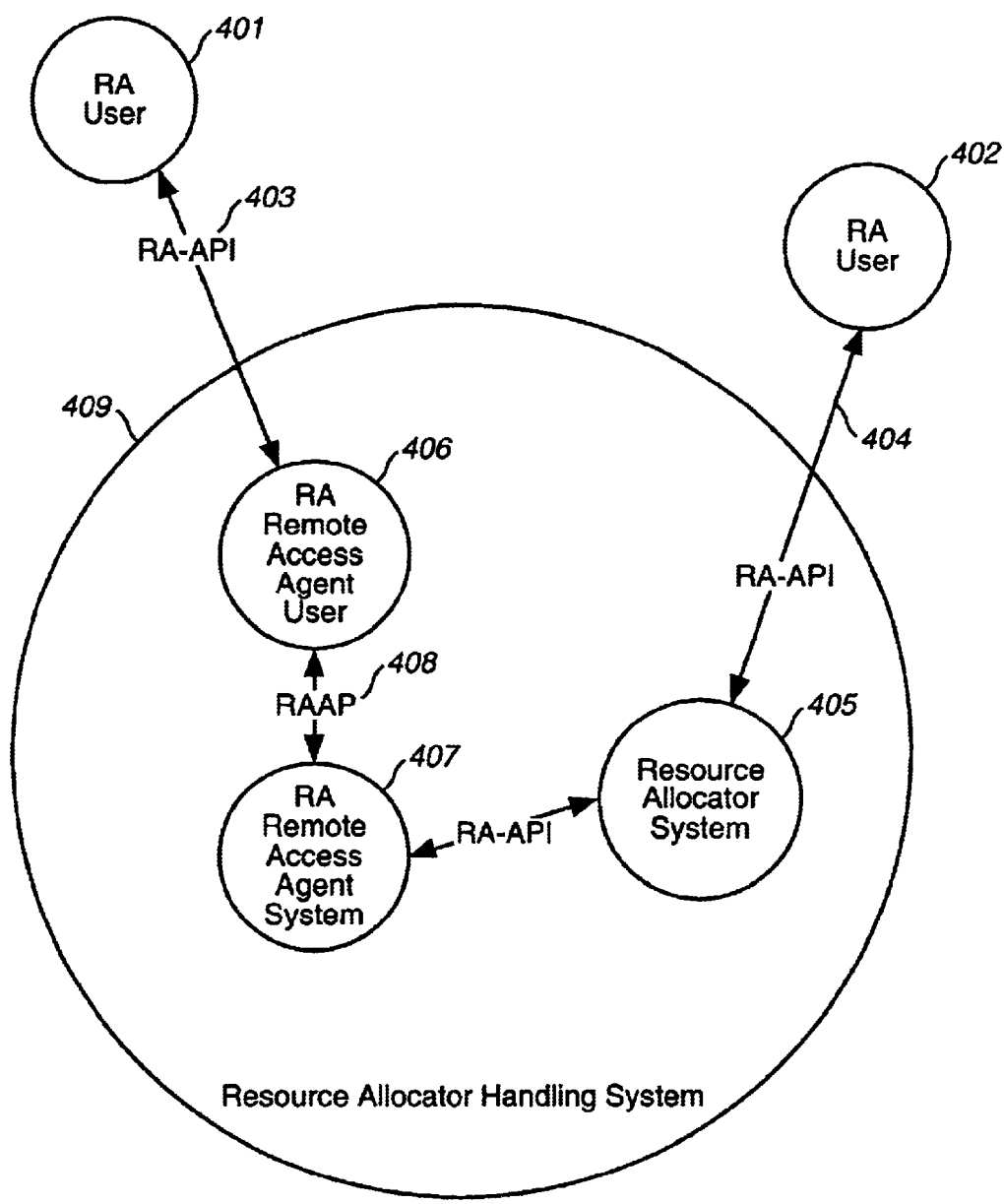
FIG. 4 displays a more detailed view of the resource allocator handling system functional interfaces.
Figure 5:
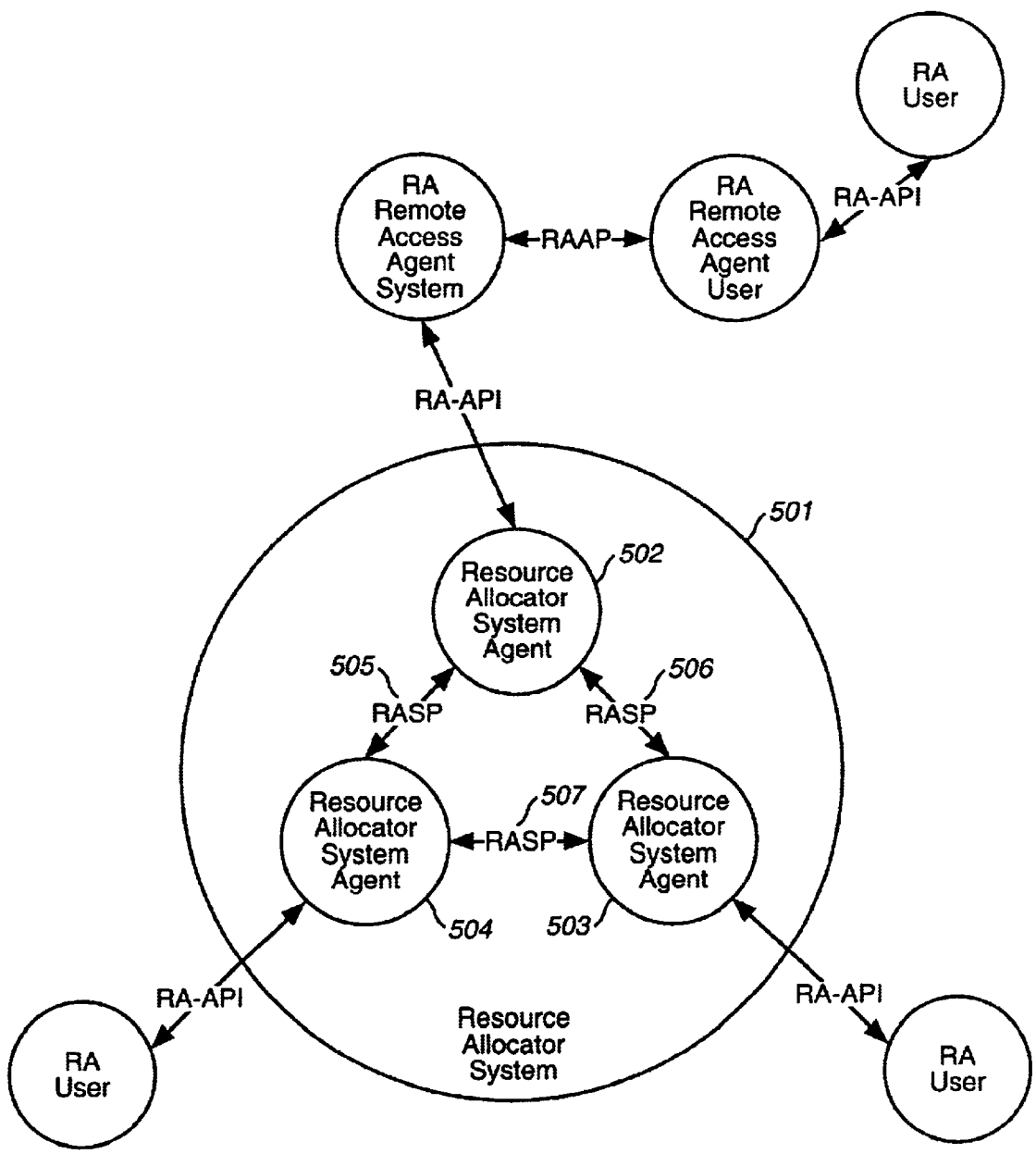
FIG. 5 shows an expanded view of the resource allocator system.

FIGS. 3–5 illustrate, in increasing detail, a functional model of the interfaces and protocols of the RAHS. FIG. 3 displays the functional interface between users of the RAHS and the RAHS as a whole. The RAHS 301 includes all separately executing RASAs running on computers connected to the communications network. Users 302–304 represent separate application programs that make requests for services of resources managed by the RAHS. The interface between the users and the RAHS, shown in FIG. 3 as bi-directional arrows between the users and the RAHS, is the RA-API, a collection of functions called by a user and executed on the user's behalf by the RAHS or called by the RAHS and executed by a user/resource.

FIG. 4 shows a somewhat more detailed view of the functional interfaces within the RAHS. The RAHS 409 in FIG. 4 has been expanded to show several additional components not shown in FIG. 3, including the resource allocator system 405 that comprises a number of RASAs. As in FIG. 3, users 401 and 402 interface to the RAHS by means of the RA-API, shown in FIG. 4 as bi-directional arrows 403 and 404.

In the expanded view of FIG. 4, it can be seen that a user may interact either directly or indirectly with the resource allocator system 405. An example of a direct interaction between a user and the RAHS is the interaction between user 402 and the resource allocator system 405 through the RA-API interface 404. An example of an indirect interaction between a user and the RAHS is the interaction between user 401 and the resource allocator system 405. The indirect interaction requires two additional RAHS components: a remote access agent user ("RAAU") 406 and a remote access agent system ("RAAS") 407. These two components serve to package RA-API calls and returned data into RAAP messages and to transport the RAAP messages over the computer network. This indirect interaction is employed when the user is running on a different computer system than the computer running the RASA to which it is interfacing. To indirectly access a remote RASA, the user interacts directly with a RAAU running on the same system as the user using the RA-API. That RAAU then communicates with a RAAS running on the same system as the RASA using the RAAP 408. The RAAS then communicates directly to the RASA running on the same computer as the RASA using the RA-API. Thus, when a user requests services from a RASA running on a remote computer, it makes those requests using the very same RA-API as it would use to make requests of a RASA running on the local computer system, and the RAAU and RAAS handle the details of transporting the RA-API over the computer network.

FIG. 5 shows an expanded view of the resource allocator system 501. The resource allocator system of FIG. 5 comprises a number of RASAs 502–504. The RASAs may run on any number of computers connected to the network, and multiple RASAs may run on the same computer. The RASAs communicate with each other using the RASP 505–507. The RASP provides an additional interface within the resource allocator system that allows each RASA to synchronize its database and its allocation and management activities with those of the other RASAs within the RAHS.

The RASP is symmetrical and supports services for the distributed aspects of the RAHS that allows resource sharing across resource management domains and synchronizes the RASAs' knowledge of maintained resources. The services provided by the RAHS through the RASP include establishing bindings with RASAs and releasing established bindings. The full complement of RASP services provided may be enhanced by an underlying database. Otherwise, the resource allocator system defines the actual services of the RASP.

The RASP usage protocol specifies the acceptable order in which services may be invoked by a RASA. The RASP bind service authenticates the RAAU and RAAS and, if successful, establishes a binding between the RA user and the RAHS. The success of the binding activity depends upon successful completion of the authentication process and the establishment of connectivity between the RAAU and the RAAS. The arguments provided to the RASP bind service include RASA invoker credentials, service priority, RASP version, and RASA invoker binding context. The RASA invoker credentials authenticate the identity of the RASA invoker. The RASA invoker credentials include the name of the RASA to which the RASA invoker is binding and the password of the RASA. The RASA performer authenticates the RASA invoker by comparing the RASA invoker's password to the password in the RASA invoker's directory entry. If the comparison is positive, authentication is successful. The RASP version argument includes the RAHS services version that the RASA invoker supports. The RASA invoker binding context argument includes the context identifier which the RASA invoker uses to correlate subsequent activity associated with this binding.

The arguments provided to the RASP unbind service are the RASA invoker binding context, the RASA performer binding context, and a service priority. The RASA performer binding context argument includes the context identifier which the RASA performer uses to correlate subsequent activity associated with this binding. The RASA performer generates the RASA performer binding context upon successful completion of the RASP bind service. The RASA invoker is required to use this value in all subsequent operations with the RASA performer.

Figure 6:
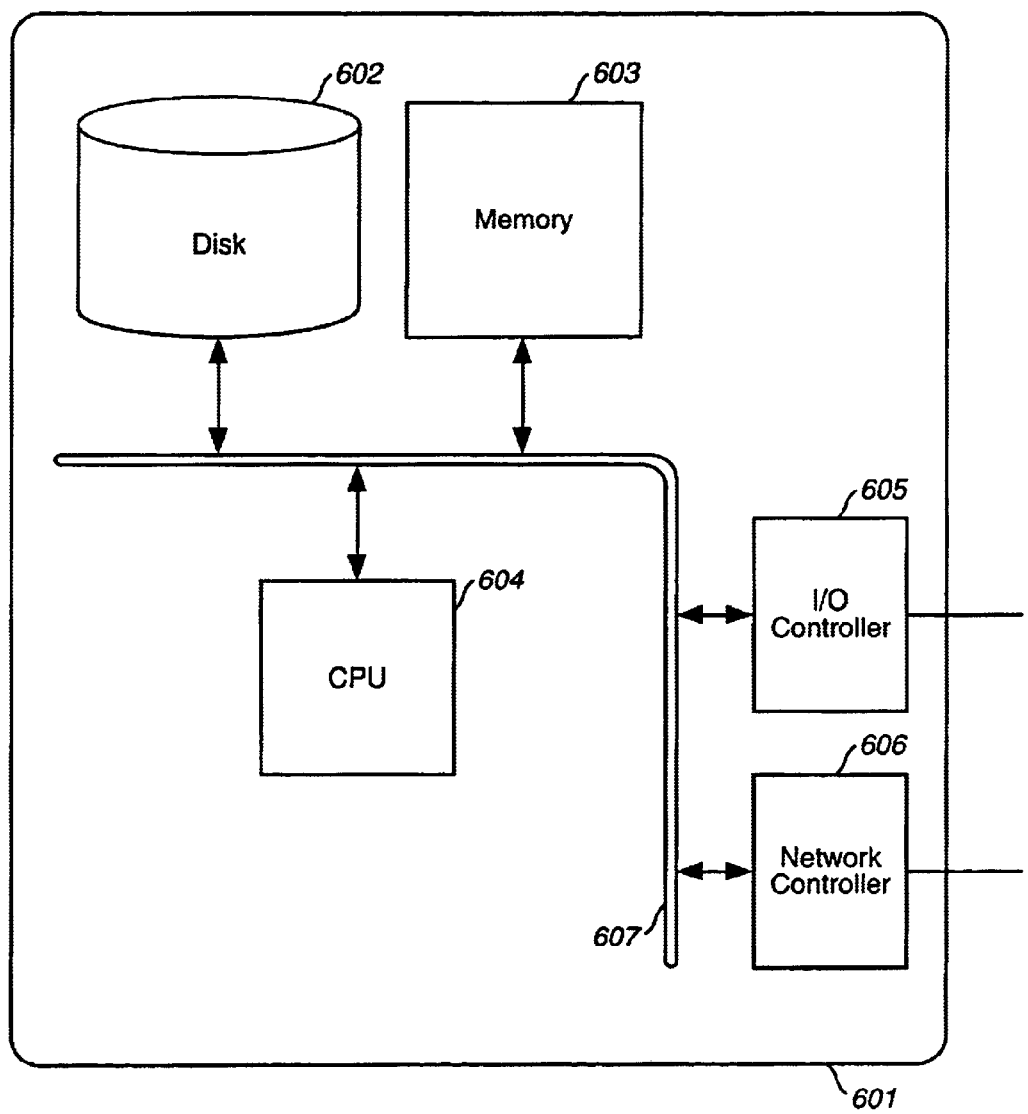
FIG. 6 is a simple diagram of a generalized computer on which the user and resource allocator system agents are executed.

FIG. 6 is a simple diagram of a generalized computer on which the various processes described above are executed. The computer 601 comprises a non-volatile data storage device, commonly a disk drive, 602, high-speed random access memory 603, a central processing unit 604, one or more input/output controllers 605, and a network controller 606. These various components exchange data over at least one internal bus 607. Software programs reside in files on the disk drive. A software program is started by moving all or a portion of the program stored on disk into memory. The central processing unit (CPU) retrieves instructions one after another from memory and executes them. Data transmission from such a computer to a physical data transmission network is accomplished under CPU control by moving data from the computer's memory over the internal bus to the network controller from where it is formatted, packaged, and transmitted to the physical data transmission network. Input/Ouput controllers and network controllers each generally comprise simple memory storage devices and microprocessors.

Figure 7:
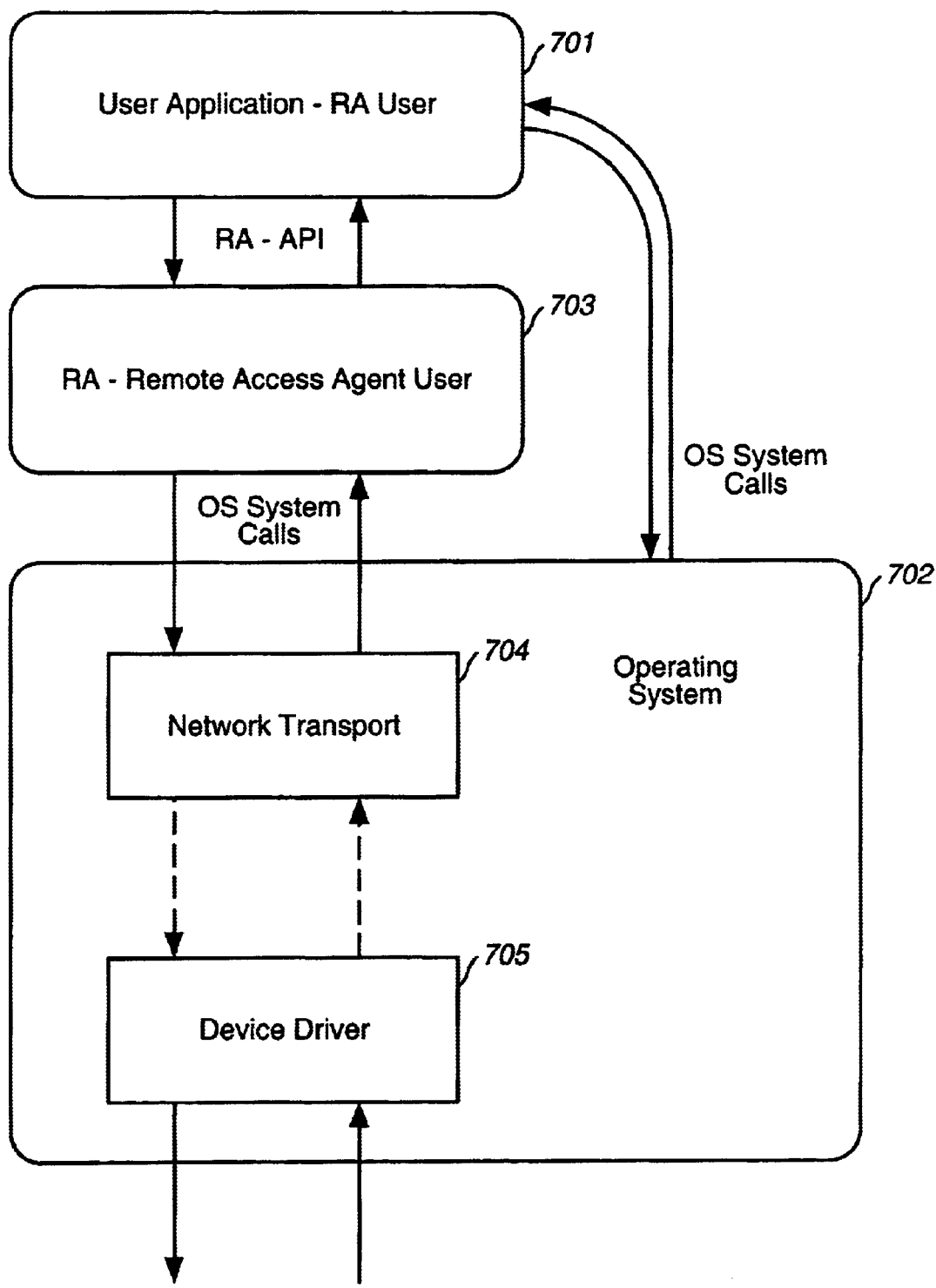
FIG. 7 displays a simple schematic diagram of some of the processes involved in implementing a communications network.

FIG. 7 displays a very simple schematic diagram of some of the processes that run on a computer system in order to allow the computer system to exchange data using a communications network. At the highest level is an application program 701. Such programs are generally written in high-level languages and provide the interface between a computer and a human user. The operating system 702 is a collection of programs that provide services to application programs through the operating system call interface. The operating system call interface provides to an application program functions that the application program can invoke to read and write data to and from the hard disk, transmit data over physical data transmission networks to remote computers, print files on a printer, and other such tasks. In addition, the operating system provides and maintains a program execution environment on a computer that allows for application programs and other intermediate processes to execute in a coordinated fashion. The RAAU 406 in FIG. 4 may run as a separate process in a computer, as shown in FIG. 7. The application program 701 communicates with the RAAU 703 using the RA-API. The RAAU in turn makes operating system system calls in order to package and send RA-API requests to a RAAS on a remote computer using the RAAP. The RAAU packages a RA-API call, along with its arguments, into a data message and passes that data message to the operating system. A subroutine or subprocess within the operating system responsible for network transport 704 further processes and packages the data message in accordance with a lower level network transport protocol. The message is then queued in memory to a very low-level operating system process called a device driver that is responsible for interacting with the network controller to actually send the packaged message over the physical data transmission network. The RAAU may also be implemented as a set of library functions that are linked to the application program, and therefore, together with the application program, constitute a single executable process on a computer.

Figure 8:
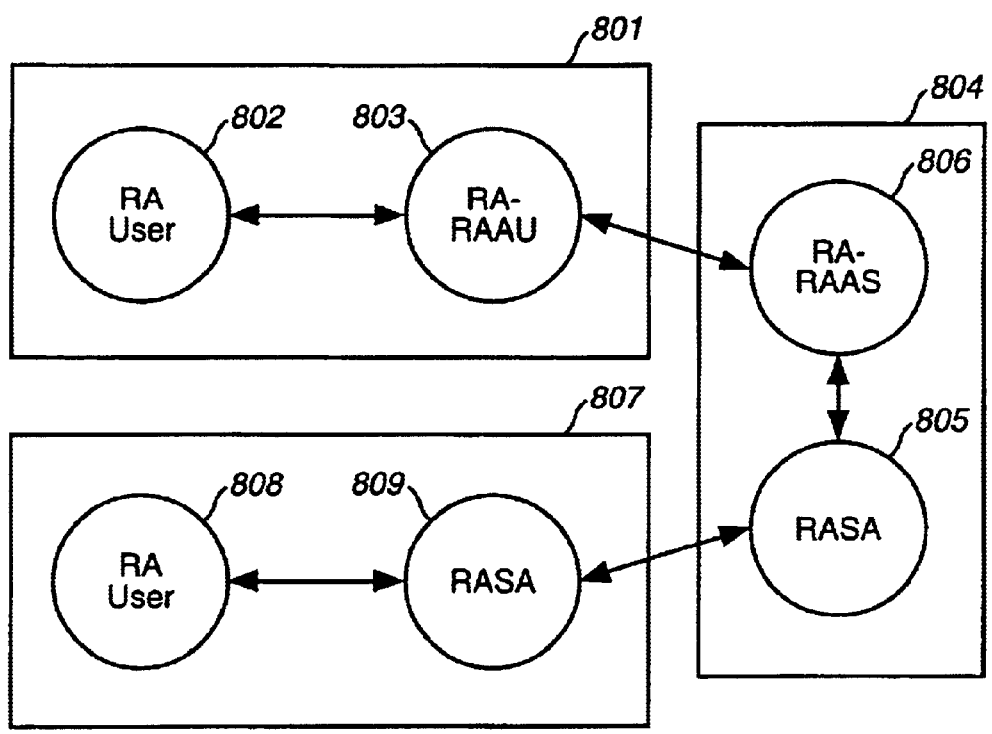
FIG. 8 displays the three basic types of resource allocator handling system component configurations.

FIG. 8 displays the three basic types of RAHS hardware component configurations. Computer 801 includes a user 802 and a RAAU 803. Computer 801 does not contain a RASA. Therefore, the user 802 must request allocation of distributed resources from a RASA located on a remote computer. Computer 804 includes a RASA 805 and a RAAS 806. No users run on computer 804. Therefore, the RASA 805 on computer 804 must receive allocation requests from users on remote computers and respond to those requests via the RAAS 806. Finally, computer 807 includes both a user 808 as well as a RASA 809. The user 808 can therefore make allocation requests and receive responses to those requests directly to and from the local RASA 809 using the RA-API. The local RASA 809 also communicates with remote RASAs, such as with RASA 805 using the RASP, in order that all RASAs exactly mirror each other's global network database and monitor each other's allocation activities.

Figure 9:
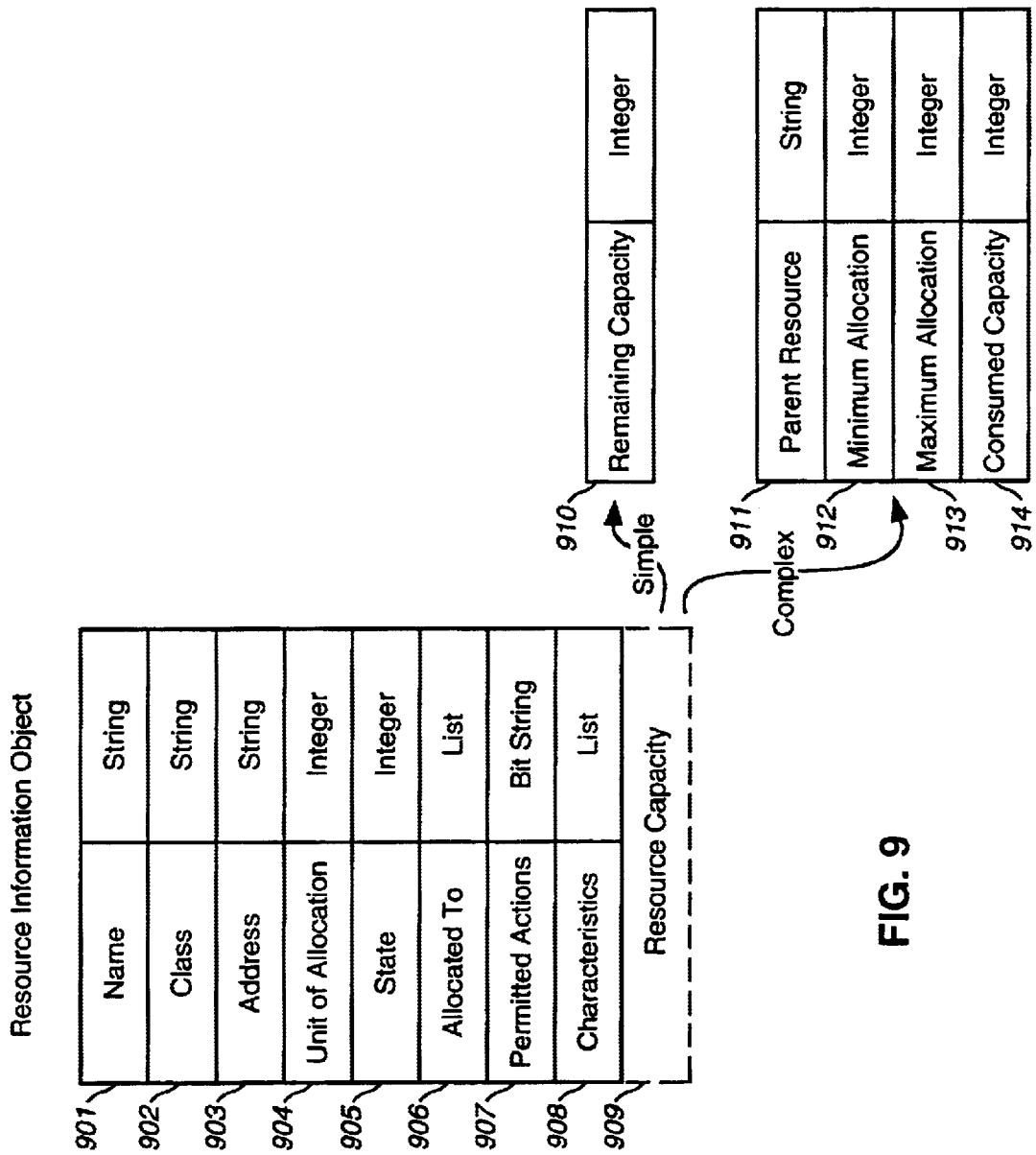
FIG. 9 displays a resource information object.

FIG. 9 displays a resource information object ("RIO"). The RASAs maintain in their GNIDs one RIO for every resource managed by the RAHS. The RIO is a collection of data fields, each having a corresponding data type. The field "name" 901 is a character string that uniquely and unambiguously identifies the resource described by a RIO. The field "class" 902 is a character string that identifies the class of resources to which the resource belongs. A resource may belong to only one class. The field "address" 903 is a character string that includes the network address of the resource. This address is provided to users when the resource is allocated to them so that the user may directly bind with an interactive resource.

The field "unit-of-allocation" 904 is an integer that specifies the amount of resource capacity that is consumed by each allocation of the resource. For instance, if the resource is a bank of ten modems, then the unit of allocation for that resource would be one, since the smallest unit of allocation would be a single modem. The capacity of that resource would be ten, since a total of ten units of allocation may be allocated. The field "state" 905 is an integer that describes the current state of the resource. A resource may have one and only one state. Resource states will be discussed further below. The field "allocated-to" 906 includes a list of user names and identifies those users to which the resource has been allocated. This field includes a list because a given resource may be allocated to more than one user. In the example cited above, for example, several different users may be allocated one or more modems from the bank of ten modems. The field "permitted-actions" 907 is a bit string that specifies the kinds of operations that may be performed by the resource. There is one bit within the bit string that corresponds to allocation operations, indicating, when set to one, that the resource described by the RIO may be allocated. Another bit within the bit string corresponds to task operations, indicating, when set to one, that tasks may be submitted to the resource described by the RIO. The contents of the permitted actions field along with the contents of the state field together represent the possible state transitions that a resource may undergo, starting from its current state, as a result of a single event or RA-API call.

The field "characteristics" 908 is a list of character strings that further specify characteristics particular to the resource described by the RIO, and may be used, for example, by a user to precisely narrow resource selections to only those resources of interest. The field "resource-capacity" 909 has two different forms, depending on whether the resource described by the RIO is a simple resource or a complex resource. In the case of a simple resource, the resource-capacity field comprises a single data element called "remaining-capacity" 910, an integer describing the number of allocation units yet to be allocated. For example, in the case of a bank of ten modems, three of which have been allocated previously to other users, remaining capacity would have the value of 7, indicating that seven modems are available for allocation. In the case of a complex resource, the resource-capacity field comprises the four data elements 911–914. The field "parent resource" 911 is a character string name of the parent resource for the complex resource. In the case of a multitasking computer having subordinate resources corresponding to processes that may be executed on the computer, the parent resource would be the name that uniquely identifies the multitasking computer. The fields "minimum-allocation" 912 and "maximum-allocation" 913 are integers that represent the minimum and maximum limits on the usage of the parent resource. The field "consumed-capacity" 914 is an integer that represents the percentage of allocatable subordinate resources that have already been allocated.

In one embodiment of the invention, initial data fields for a resource's RIO may arrive at a GNID from the resource itself. For example, the resource may comprise a data structure in microcode that can be transmitted into the GNID. In yet another alternate embodiment, the GNID comprises data dispersed throughout the managed resources. In this embodiment, the GNID database may include data stored within the resource itself and data stored with the RAHS.

Figure 10:
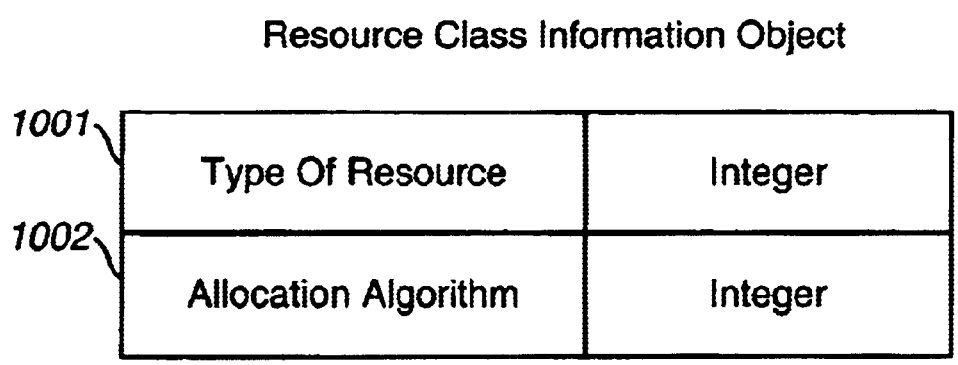
FIG. 10 displays a resource class information object.

Along with RIOs, each RASA maintains information about the various resource classes available on the communications network. FIG. 10 displays a resource class information object that comprises two data fields and that is stored in the GNID maintained by each RASA. The field "type-of-resource" 1001 is an integer that represents the type of the resource represented by this resource class. This field can indicate whether the resource is a complex superior resource, a complex subordinate resource, or a simple resource. The field "allocation-algorithm" 1002 is an integer that specifies one of many possible allocation algorithms by which the resource is to be allocated when requested by users.

The table displayed in FIG. 11 is a high-level description of the interface provided by the RA-API and RAAP. This is essentially a list of the functions provided to users by the RAHS. In the case of one function, "Perform-Task," the RAHS invokes the function and a user performs the function. For all other functions, the RAHS performs the function at the request of the user.

The functions "Bind" and "Unbind" are used to begin a session and end a session, respectively, between a user and the RAHS. The functions "Register-Resource" and "Unregister-Resource" cause a RAHS to add and delete resource information objects from the global network information database. The functions "Begin-Allocating-Resource" and "Stop-Allocating-Resource" cause the RAHS to make a resource available for allocation to users and to terminate allocation of a resource by users, respectively. The function "Allocate-Resource" represents a request by a user to allocate a resource for subsequent use. The function "Set-Current-Capacity" allows a resource acting as an RA user to set the remaining capacity field of the RIO corresponding to that resource stored in the GNID. The function "Deallocate-Resource" represents a request by a user to release a resource that the user has previously allocated. The function "Schedule-Task" essentially represents a request by a user to queue a task to a task-oriented resource. The function "Perform-Task" is called by the RAHS to cause a user, in this case the user being a resource, to perform a scheduled task. Finally, the function "Provide-Next-Task" allows a user, in this case a resource, to request from the RAHS the next task of a series of tasks to be performed.

Figure 12:
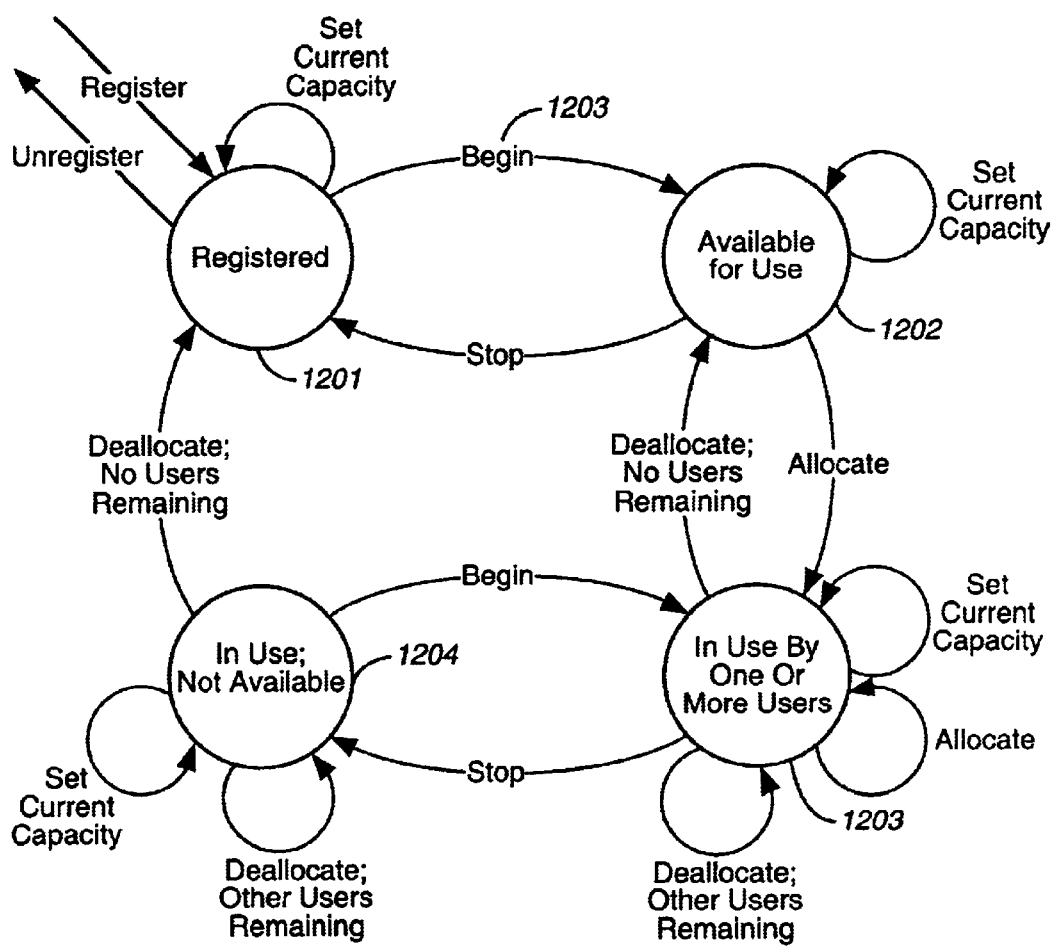
FIG. 12 represents the state transition diagram for a simple resource or a complex subordinate resource.

FIG. 12 represents the state transition diagram for a simple resource or for a complex subordinate resource. Such a resource may have any of the following four states: "Registered" 1201, "Available for Use" 1202, "In Use by One or More Users" 1203, and "In Use—Not Available" 1204. The arrows connecting these four states represent transitions elicited by the performance of RA-API functions listed in FIG. 11 by the RAHS. For example, a call to the function "Begin-Allocating-Resource" will cause a resource in the state "Registered" 1201 to Begin 1203 transition to the state "Available for Use" 1202.

Figure 13:
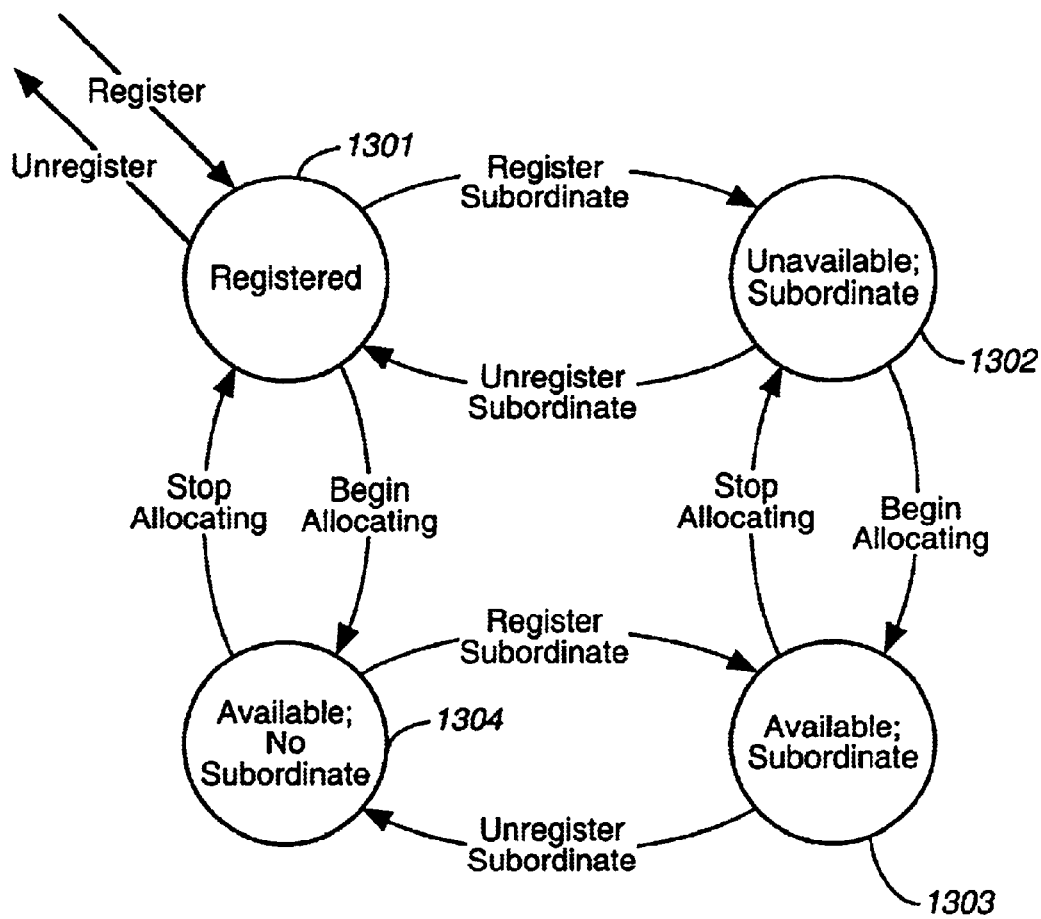
FIG. 13 displays a state transition diagram for a complex superior resource.

FIG. 13 displays a state transition diagram for a complex superior resource. A complex superior resource also has four states: "registered" 1301, "unavailable subordinate" 1302, "available subordinate" 1303, and "available—no subordinate" 1304. As in FIG. 12, state transitions occur when the RAHS executes functions invoked by a user through the RA-API. For example, a complex superior resource that has been registered and is currently in the state "registered" 1301 transitions to the state "unavailable subordinate" 1302 when a user calls the function "Register-Resource" to register a complex subordinate resource that depends on the complex superior resource represented by the state transition diagram.

Figure 14:
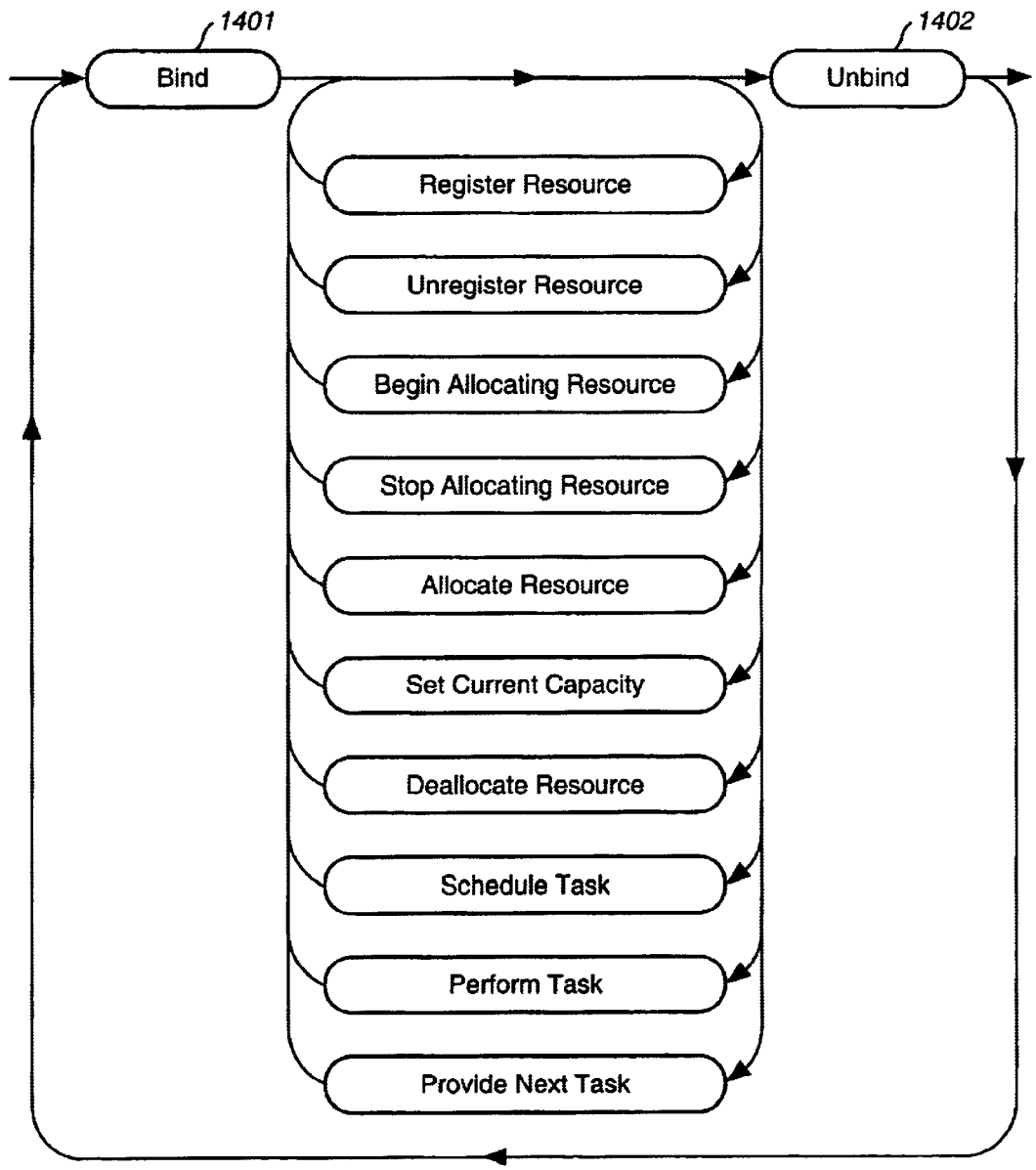
FIG. 14 displays a protocol flow control diagram that describes the resource allocator application programming interface and resource allocation access protocol.

FIG. 14 displays a protocol flow control diagram which shows the orderings of function calls invoked by a user as it establishes a session and makes requests to the RAHS. FIG. 14 indicates that the first function that must be called by a user is the function "Bind" 1401. Subsequently, the user may call any of the remaining ten functions apart from the "Unbind" function. Although these functions may be called in any order, certain of them will return error conditions if they are called prior to calling another of the functions. For example, one cannot call the function "Allocate-Resource" and specify a resource that has not previously been registered through a call by some user to "Register-Resource." When the user has finished allocating and making use of distributed resources, the user calls the function "Unbind" 1402 to terminate the session with the RAHS.

The RA-API functions listed in FIG. 11 will be more fully described below, including the arguments specified when the functions are called. The function "Bind" authenticates a user to the RAHS and, if successfully executed by the RAHS, establishes a session between the user and the RAHS. This established session is the context in which all other RA-API functions are performed. The success of the function "Bind" is dependent upon successful completion of an authentication process. Arguments supplied to Bind include: (1) user credentials; (2) service priority; (3) version; and (4) the user session context. The user credentials argument includes the credentials of the user. These credentials are based on user identification and password protection sufficient for protecting access to a private network. In a public network, more secure authentication credentials are used. The service priority argument specifies the urgency or non-urgency with which the user wants the invoked service to be performed by the RAHS. Possible service priority values are low, medium, and high. The RAHS performs services in order of priority and time of arrival, with the highest priority request performed first. The version argument specifies the version of the services which the user is allowed to use for the session. The user session context is an optional argument that, when present, specifies a context identifier with which the user correlates subsequent activity associated with this session.

Execution of the function "Bind" by the RAHS causes the RAHS to return a result comprising the user session context, an RAHS session context, the service priority, RAHS credentials, and a version number. The RAHS session context is a context identifier which the RAHS uses to correlate subsequent activity with the associated session. This returned RAHS session context is paired with the user session context to form a session context, essentially a handle, that identifies the session initiated by the call to Bind. The service priority returned by the RAHS is the service priority elected by the RAHS for the session established by this call to Bind. The version returned by the RAHS is the version of the services which the RAHS supports. Finally, the credentials returned by the RAHS includes the credentials of the RAHS. These credentials are used by the user to authenticate the identity of the RAHS.

The function "Unbind" causes the RAHS to terminate a session previously established by a call to Bind. Arguments supplied to Unbind include a session context and a service priority. The session context is the handle established or returned by a previously executed call to Bind.

The function "Register-Resource" establishes within the RAHS knowledge of a new resource and causes the RAHS to store a resource information object representing the resource into all the separate databases maintained by RASAs within the communications network. Arguments supplied to the function "Register-Resource" include: (1) session context; (2) service priority; (3) resource name; (4) resource class; (5) resource address; (6) unit of allocation; (7) resource capacity; (8) permitted actions; and (9) characteristics. The session context is the session context established during a prior call to the "Bind" function. Service priority is the priority requested by the user for execution of this function. The remaining arguments specify the fields of the resource information object as shown in FIG. 9 and discussed above.

The function "Unregister-Resource" removes a resource identifier object from all the databases maintained by the resource allocator system agents within the communications network. The resource is thus removed from the allocatable resource pool. Parent resources, i.e., complex superior resources, cannot be unregistered until all of the subordinate resources that depend on the parent resource are unregistered. Arguments supplied to Unregister-Resource include: (1) a session context; (2) a service priority; and (3) the name of the resource to be unregistered.

The function "Begin-Allocating-Resource" directs the RAHS to begin allocating a specified resource. Arguments supplied to "Begin-Allocating-Resource" include: (1) a session context; (2) a service priority; and (3) the name of the resource. As discussed above, in the case of a simple resource, successful completion of this function causes a state transition of the resource from the state "registered" to the state "available for use" as shown in FIG. 12.

The function "Stop-Allocating-Resource" terminates allocation of a specified resource. Arguments supplied to "Stop-Allocating-Resource" include: (1) a session context; (2) a service priority; and (3) the name of the resource that the user wishes to no longer be allocated. Execution of this function results in a state transition for the resource, as described in FIG. 12.

The function "Allocate-Resource" represents a request by a user to allocate the specified resource. Arguments supplied to Allocate-Resource include: (1) a session context; (2) a service priority; (3) a resource class; (4) max wait duration; (5) request time; and (6) wait priority. The argument "max wait duration" specifies the maximum time which the user will wait for the resource to be allocated. The argument "request time" establishes a time that the user wants the RAHS to use in providing a first-come-first-serve service. The user may use the current date and time or use the date and time at which some higher level context was initiated. The argument "wait priority" establishes the wait priority for allocation of resources for a requested operation. The function "Allocate-Response" returns the address of the allocated resource if it is successfully allocated. This address corresponds to the resource address field of the resource information object 903 in FIG. 9.

The function "Set-Current-Capacity" establishes the remaining capacity of a complex resource. Arguments supplied to Set-Current-Capacity include: (1) a session context; (2) a service priority; (3) a resource name, and (4) a new capacity.

The function "Deallocate-Resource" releases a previously allocated resource and returns it to the pool of unallocated resources. Execution of this function results in a state transition for the resource as described by FIGS. 12 and 13. Arguments supplied to Deallocate-Resource include: (1) a session context; (2) service priority; and (3) the name of the resource to be deallocated.

The function "Schedule-Task" enables a user to enqueue a task to a specified resource. Arguments supplied with this function include: (1) a session context; (2) a service priority; and (3) a function. The argument "function" specifies how the task is to be queued. A task may be queued to a resource class so that the RAHS can determine a particular member of the class to execute the task, or it may be queued to a specific resource identified by the name or by the network address of the resource.

The function "Perform-Task" is called by the RAHS to instruct an allocated resource to perform a scheduled task. Arguments supplied with this function include: (1) a session context; (2) a service priority; and (3) a task ID which identifies a task to be performed. The function "Performs-Task" returns a result which indicates that: (1) the task has been completed; (2) that the task has been rescheduled to be completed by another resource; or (3) that no resource was able to perform the task.

The function "Provide-Next-Task" provides a user or resource with the ability to request from the RAHS another task to perform. In other words, the RAHS maintains a batch of tasks to be performed by this resource and the resource requests tasks from the RAHS one at a time. The result of this function call indicates either that no further tasks are available to perform or that the next task will be sent as a result of a following "Perform-Task" call by made the RAHS to the user or resource.

Figure 15A:
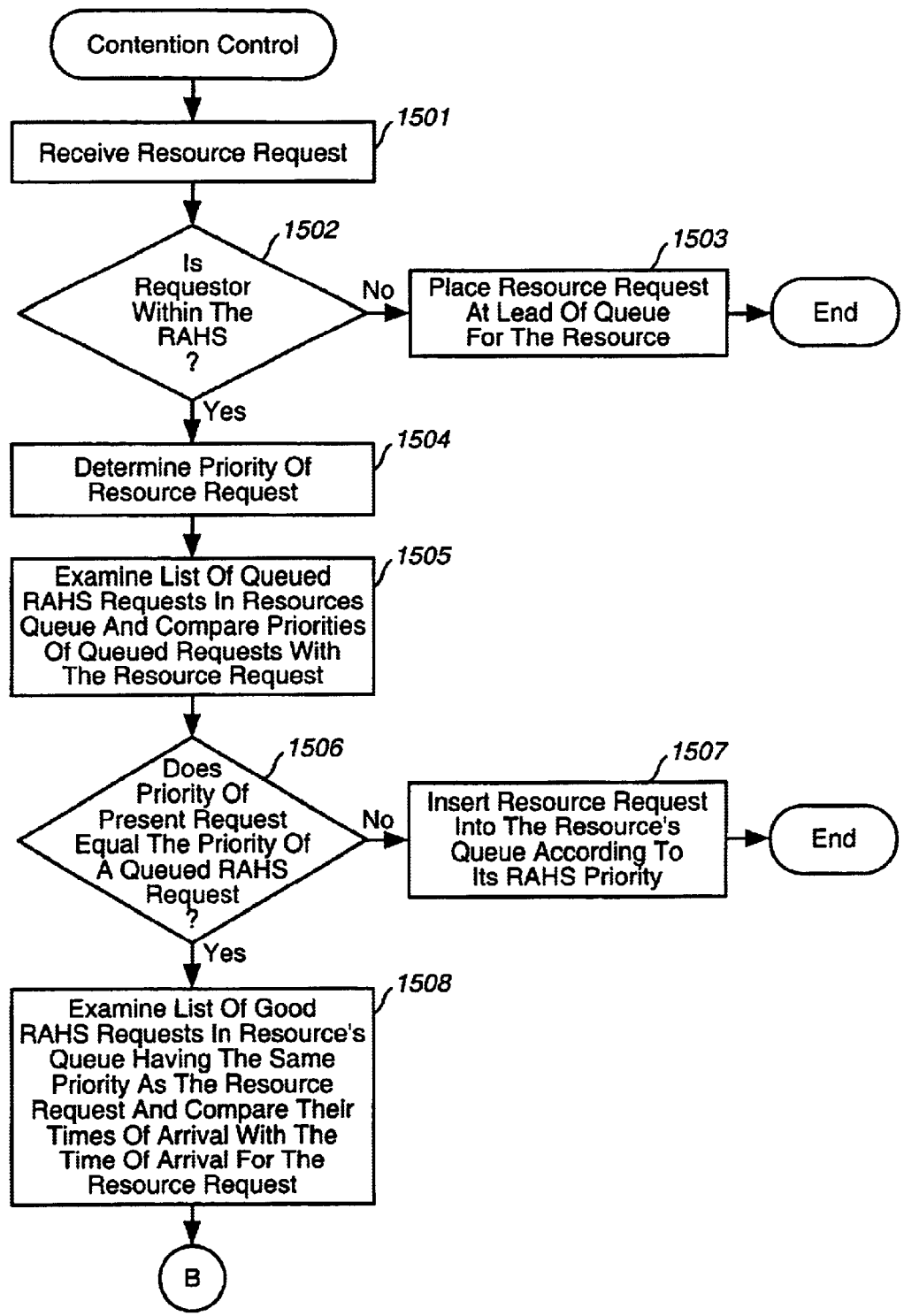
FIGS. 15A and 15B provide flowcharts illustrating the contention control procedure followed by the RAHS.
Figure 15B:
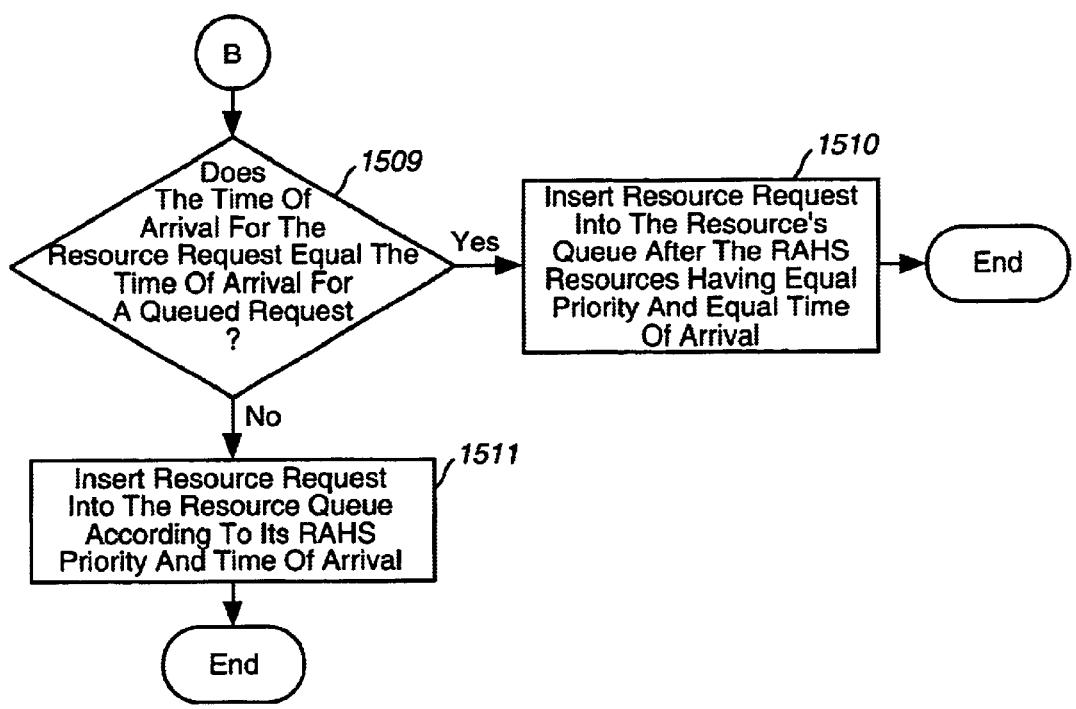

The RAHS provides a contention control mechanism for resolving contentions between multiple application programs vying for the same resource. FIGS. 15A and 15B provide flowcharts illustrating the contention control procedure followed by the contention control mechanism in the RAHS.

A receiver associated with a RASA receives a resource request (step 1501). The resource request may arrive from an RA user within the RAHS, or the resource request may come from an application outside the RAHS. The contention control mechanism determines if the resource-requesting application is within the RAHS (step 1502). If the resource request comes from outside the RAHS, then the contention control mechanism gives the request priority over requests arising from within the RAHS. Some resources, such as modems are available both from within the RAHS and from outside the RAHS. For example, a typical high-speed modem has a bi-directional capability and thus supports both incoming (non-RAHS) and outgoing (RAHS) resource requests. Because a PSTN does not coordinate with the messaging host on the allocation of modems, a modem might be seized by the PSTN for incoming traffic at the same instance that the resource is allocated to an outgoing message. Thus, always giving a non-RAHS resource request priority over a RAHS resource request resolves this possible source of contention. The contention control mechanism places a non-RAHS resource request at the head of a queue for the resource (step 1503). The contention control mechanism does not allow a resource request to seize a resource presently in use, according to one embodiment of the invention.

If the contention control mechanism determines that the resource requester is within the RAHS (step 1502), the contention control mechanism then determines the priority of the RA user's resource request (step 1504). This priority may be the wait priority previously discussed. In another embodiment, this priority may be the previously discussed service priority. The contention control mechanism analyzes the previously queued RAHS-originated resource requests in the resource's queue and compares the priorities of the queued resource requests with the present resource request's priority (step 1505). If the priority of the present resource request differs from the priorities of the previously queued RAHS-originated resource requests (step 1506) then the contention control mechanism inserts the resource request into the resource's queue according to its priority (step 1507).

If the contention control mechanism determines that the priority of the present resource request matches the priority of at least one previously queued RAHS-originated resource request (step 1506) then the contention control mechanism compares the time of arrival for the previously queued RAHS-originated resource requests having the same priority as the present resource request with the time of arrival for the present resource request (step 1508).

If the time of arrival for the present resource request matches the time of arrival for a previously queued RAHS-originated resource request also having the same priority, then the contention control mechanism inserts the present resource request into the resource's queue following the previously queued RAHS-originated resource request having the same priority and the same time of arrival (step 1510). If the time of arrival for the present resource request differs from time of arrival for the previously queued RAHS-originated resource requests having the same priority (step 1509) then the contention control mechanism inserts the present resource request into the resource's queue according to its priority and time of arrival (step 1511). The contention control mechanism may operate upon resource request characteristics other than priority and arrival time, although these characteristics have been utilized in the exemplary embodiments discussed herein.

The RA user provides the time of arrival for a resource request. The contention control mechanism does not verify the time of arrival, according to one embodiment of the invention. This embodiment gives the RA user the freedom to submit priorities and times of arrival and assumes that the RA user will select priorities and times of arrival that are fair to the other RA users. In an alternate embodiment of the invention, the contention control mechanism verifies the time of arrival and priority of the resource request. In yet another alternate embodiment, the contention control mechanism provides a time stamp to mark a resource request's arrival time.

The RASA coordinates with the contention control mechanism to ensure quality of service (QoS). Quality of Service enforces a requirement that a service be performed within a specified time period or that an indication be provided that the service could not be performed within the specified time period. The period of time to perform a service is typically based on the service's priority. The RA user, and not the RASA, sets the start time of the QoS time period, allowing application of QoS in a greater context than just that of a single RASA or a single resource. For example, an RA user may need to request multiple resources for a given task, and a QoS time-out for just one of these resources would prevent the successful completion of all of the RA user's resource requests for this task. In one embodiment, RA users must specify a QoS time period. In this embodiment, the RA user must also specify a resource to act on behalf of the RA user application by responding to QoS time-outs.

Figure 16A:
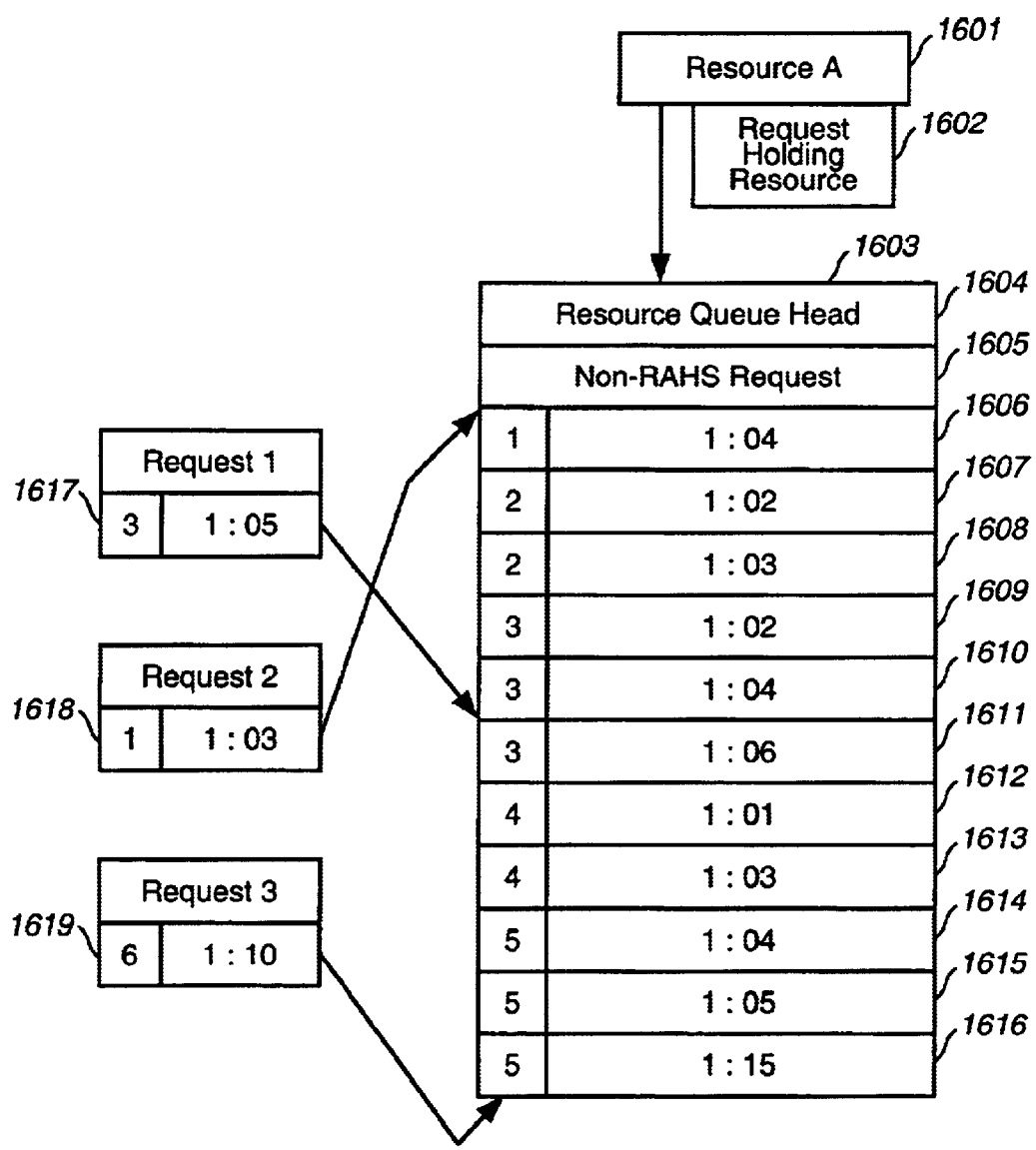
FIGS. 16A and 16B provide an example of the contention control procedure illustrated by the flowcharts provided in FIGS. 15A and 15B.
Figure 16B:
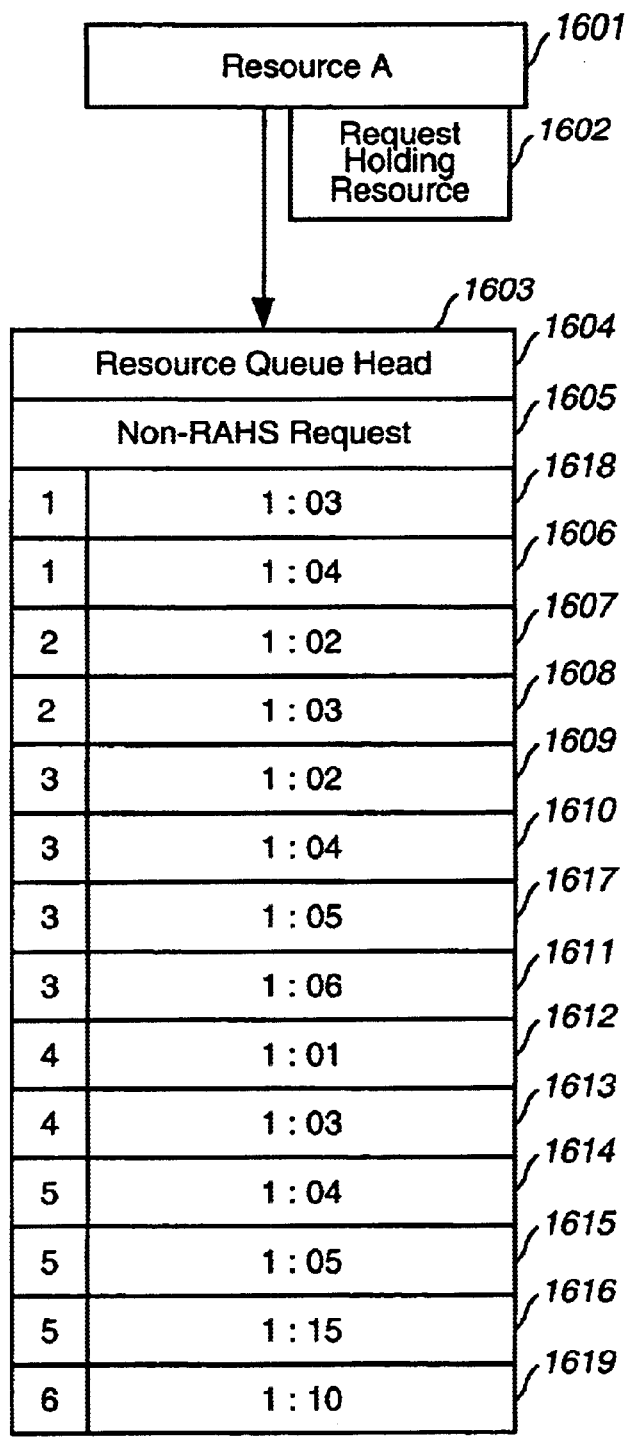

FIGS. 16A and 16B provide an example of the contention control procedure illustrated by the flowcharts of FIGS. 15A and 15B. FIG. 16A shows a Resource A 1601 being held by a resource request 1602. The Resource A 1601 has a resource queue 1603 having a resource head 1604. A non-RAHS resource request 1605 heads the top of the resource queue 1603. As previously discussed, non-RAHS resource requests will always be given priority over RAHS-originated resource requests. The resource queue 1603 also has queued RAHS-originated resource requests 1606–1616. The contention control mechanism in the RAHS receives three new requests for the Resource A 1601, requests 1617–1619. Whether the new requests 1617–1619 arrive simultaneously or not, the queuing result will be the same.

The new request 1617 has a priority of 3 and a time of arrival of 1:05. Accordingly, the contention control mechanism queues the new request 1617 in the resource queue 1603 between the queued resource 1610, having a priority of 3 and a time of arrival of 1:04, and the queued resource 1611, having a priority of 3 and a time of arrival of 1:06. Because the priority of new request 1617 matched the priority of a previously queued resource request, the contention control mechanisms queued resource request 1617 on the basis of both priority and time of arrival.

The new resource request 1618 has a priority of 1 and a time of arrival of 1:03. The new request 1618 has a higher priority than any of the other RAHS queued requests 1606–1616. Accordingly, the contention control mechanism inserts new request 1618 before any of the RAHS queued requests but following the non-RAHS queued request 1605. The new request 1619 has a lower priority than any of the other queued RAHS requests 1606–1616. Accordingly, the contention control mechanism inserts the new request 1619 at the bottom of the resource queue 1603. In placing new requests 1618 and 1619 in the resource queue, the contention control mechanism only had to reference the request's priority and not the time of arrival.

FIG. 16B illustrates the resource queue 1603 following the insertion of the new resource requests 1617–1619. The resource request 1618 has been inserted into the resource queue 1603 between the non-RAHS request 1605 and the RAHS request 1606. The RAHS request 1617 has been inserted into the resource queue 1603 between resource request 1610 and resource request 1611. The resource request 1619 has been inserted into the queue 1603 following the queued resource 1616.

Table 1 below provides pseudocode illustrating an exemplary embodiment of the contention control procedure. As shown in Table 1, a contention control function in the RAHS receives input from the resource requester and the resource's queue. The resource requester may either be an RA user or a non-RAHS user. The contention control function includes a pointer variable QPtr. If the requester is not in the RAHS, then the requester's resource request is placed at the head of the resource's queue. If the requester is in the RAHS, then QPtr is directed to the first queued RAHS-originated resource request in the resource's queue. The contention control mechanism then compares the requester's priority field to the priority field of the queued request pointed to by QPtr. If the requester's priority field is less than the priority field of the queued request pointed to by QPtr, then the requester is inserted into the resource's queue. A lower priority field indicates a higher priority; e.g., a priority of "1" is higher than a priority of "3." If the requester's priority field is greater than the priority field pointed to by QPtr, then QPtr is advanced to the next queued resource request. Once the contention control mechanism has determined that the resource request's priority either exceeds all of the presently queued RAHS-originated resource request priorities, then the RASA inserts the resource request at the end of the resource's queue. If the priority of the resource request falls between existing priorities in the queue, then the RASA inserts the resource request between those priorities. If the contention control mechanism determines that one or more queued RAHS-originated resource requests have priorities matching that of the resource request, then the contention control mechanism compares the resource request's time of arrival with the time of arrivals for queued RAHS-originated resource requests having the same priority. The contention control mechanism then inserts the resource request into the resource's queue according to both priority and time of arrival. Thus, the contention control mechanism inserts the resource request into the resource's queue among those queued resources having the same priority according to its time of arrival.

TABLE 1

```
Contention Control (Requester. Resource's Queue)
    Pointer Variable QPtr:
    {
        If (Requester not within Resource Allocator Handling System)
            then
            {
                place Requester at head of Resource's Queue:
            }
        else
        {
            QPtr←First Queued RAHS-originated Resource Request in Resource's Queue:
            If   (Requester's Priority Field < QPtr's Priority Field)
                then
                {
                    Insert Requester into Resource's Queue at position preceding QPtr:
                }
                else
                {
                    Until ((Requester's Priority Field ≦ QPtr's Priority Field) or (End
                                            of Queue))
                    {
                        QPtr+ +:
                    }
                    If   ((Requester's Priority Field < QPtr's Priority Field) or (End
                                            of Queue))
```

TABLE 1-continued

```
        then
        {
            If (End of Queue)
                then
                {
                    Insert Requester into Resource's Queue at
                        position following QPtr:
                }
                else
                {
                    Insert Requester into Resource's Queue at
                        position preceding QPtr:
                }
        }
        else
        {
            If (Requester's Arrival Time field < QPtr's Arrival Time
                    field)
                then
                {
                    Insert Requester into Resource's Queue at
                        position preceding QPtr:
                }
                else
                {
                    Until ((Requester's Arrival Time field < QPtr's
                            Arrival Time field) or
                            (Requester's Priority field ≦ QPtr's
                            Priority field))
                    {
                        QPtr+ +:
                    }
                    If  ((Requester's Priority field < QPtr's
                            Priority field) or (Requester's Arrival
                            Time field < QPtr's Arrival Time
                            field))
                        then
                        {
                            Insert Requester into Resource's
                            Queue at position preceding QPtr:
                        }
                        else
                        {
                            Insert Requester in Resource's Queue
                            at position following QPtr;
                        }
                }
        }
    }
}
```

Figure 17:
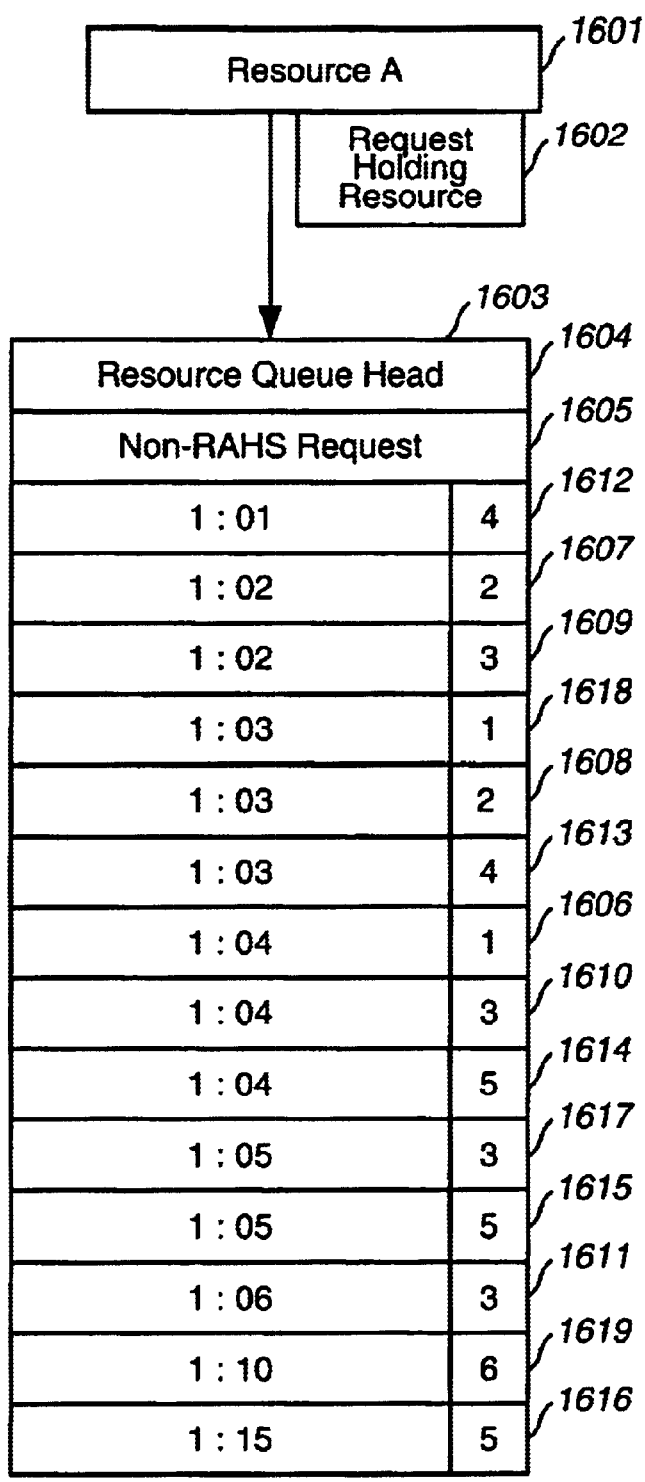
FIG. 17 illustrates an alternate embodiment of the contention control queuing procedure.

FIG. 17 illustrates an alternate embodiment of the contention control queuing procedure shown in FIGS. 16A and 16B. In this alternate embodiment, the contention control mechanism queues resource requests in the resource queue 1603 according to time of arrival and then priority. In this alternate embodiment, the non-RAHS request 1605 still heads the resource queue 1603 for the reasons previously provided. However, the contention control mechanism has now queued resource requests 1606–1619 according to time of arrival first and then priority second. Accordingly, resource request 1612, having a priority of 4 and a time of arrival of 1:01 heads the list of queued RAHS-originated resource requests in the resource queue 1603. Resource requests 1618, 1608, and 1613 each have identical times of arrival of 1:03. Thus, these resources have also been subsequently ordered according to their respective priorities of 1, 2, and 4. Thus, resource request 1618 precedes resource request 1608, which in turn precedes resource request 1613. In all other respects this embodiment operates in the manner previously described.

The RASA validates resource requests from RA users by authenticating the RA user. The access network between RA users and the RAHS is private and generally not subject to the same security threats as a public network. This allows a simple, or weak authentication scheme to be adequate for the RA users and the RAHS in at least one embodiment of the invention. A simple authentication scheme may be based on an identification and a password. Each RA user and the RAHS has an identification and a password. The identification serves as the identity of an entry in a shared directory in the RAHS. Authentication comprises of two parts: the RAHS authenticates the RA user, and the RA user authenticates the RAHS.

Figure 18:
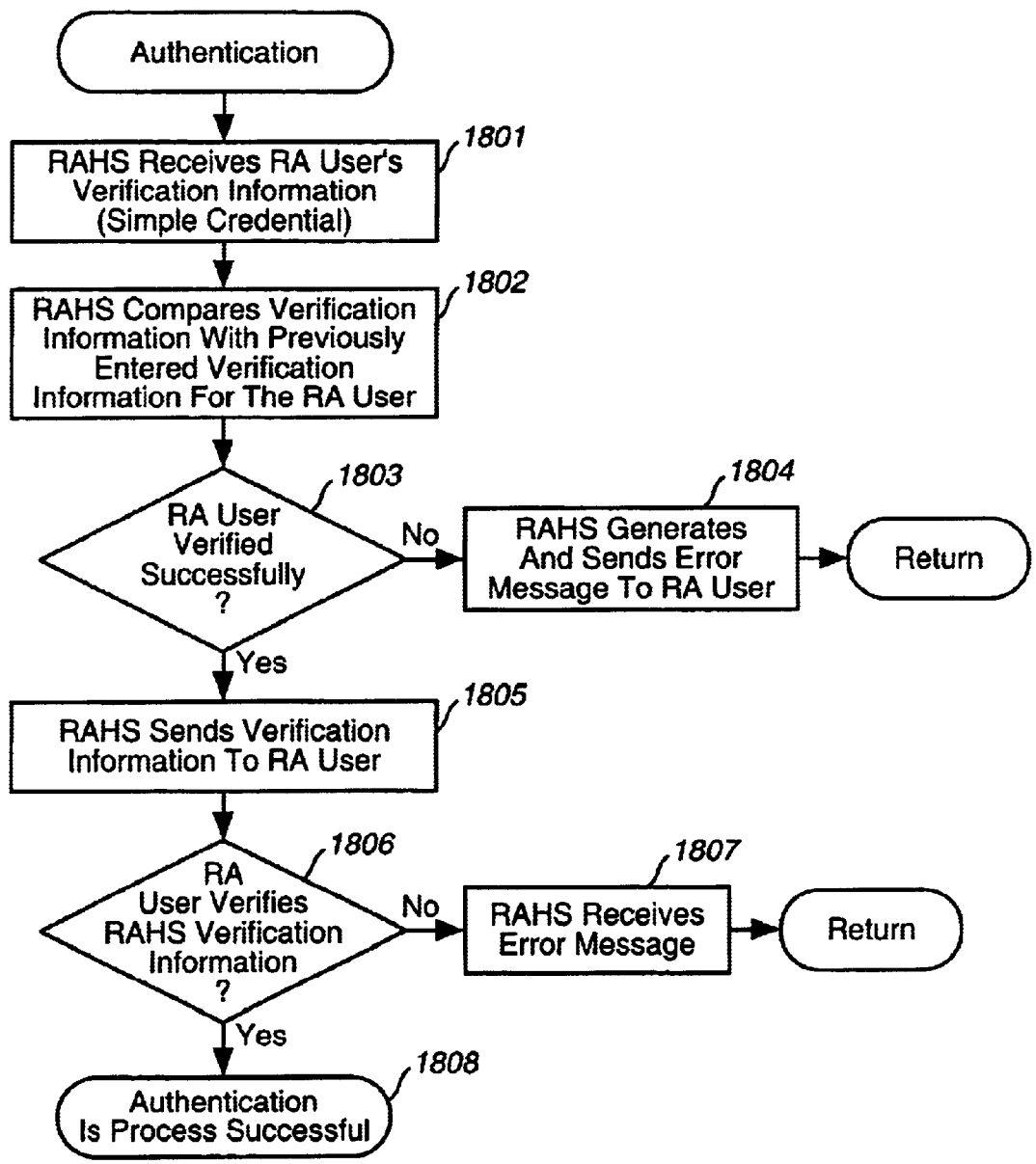
FIG. 18 provides a flowchart illustrating the authentication procedure between RA users and the RAHS.

FIG. 18 provides a flowchart illustrating the authentication procedure. For the RAHS to authenticate the RA user, the owner of the directory entry, reads its own password from the entry and with its name forms verification information, a simple credential, that is passed as an argument in the previously discussed API-Bind function. The RAHS receives the verification information (step 1801) and compares the received verification information with the verification information previously stored for the RA user in the directory (step 1802). If RAHS cannot verify the RA user (step 1803), then the RAHS generates and sends an error message to the RA user (step 1804). If the comparison is positive (step 1803), authentication is considered successful, and the RAHS returns a Bind result. When the RAHS returns the Bind result, the RAHS also sends verification information to the RA user (step 1805). The verification is typically compiled by a RASA that reads from its directory its own password and with its own name forms the verification credentials. The RA user then asks the directory to compare the received password against the password in the RASA's entry. If the RA user cannot verify the RAHS, then the RAHS receives an error message from the RA user (step 1807). If the comparison is positive, then the authentication process has succeeded (step 1808). The RAHS does not receive notice of the RA user's successful verification, according to one embodiment of the invention.

A resource may not be reserved prior to its actual use in the preferred embodiment of the present invention. In order for a RA user to reserve a resource prior to its use, the RA user must request the resource and then maintain its hold on the resource until the RA user needs the resource. Because of the inactivity time-outs provided by the RAHS, the RA user not only has to seize the resource ahead of its intended time of use but must also create the appearance that the RA user is actually using the resource in order to keep an inactivity time-out from occurring.

As previously discussed, the RAHS does not mark the time of arrival for a resource request. Only the RA user supplies the time of arrival. The RA user also keeps track of times of arrival. Thus, because of the previously mentioned QoS considerations, an RA user having previously received a QoS time-out may retain the initial time of arrival for a resource request and use it in a subsequent request for the resource. For example, an RA user requests a resource at a time of 1:00 p.m. The resource is presently seized by another RA user, and the resource does not come free within the RA user's QoS time period. At some later point, the RA user resubmits the request for the resource, and this new resource request retains the initial time of arrival of 1:00 p.m.

As previously discussed, in one embodiment of the invention, the contention control mechanism gives a resource request coming from outside the RAHS priority over requests arising from within the RAHS. In an alternate embodiment of the invention, non-RAHS resource requests may be considered of lesser urgency than resource requests originating from within the RAHS. Accordingly, non-RAHS requests will be placed at the bottom of the resource's queue. In yet another alternate embodiment, resource requests arising from outside the RAHS are considered to have equal urgency to requests arising from with the RAHS. Thus, the contention control mechanism examines resource request characteristics for the non-RAHS resource requests and queues these requests in the resource's queue along with the RAHS-originated resource requests according to the characteristics examined by the contention control mechanism.

While the present invention has been described with reference to a preferred embodiment thereof, those skilled in the art will appreciate that various changes in form and detail may be made without departing from the intended scope of the present invention as defined in the appended claims. For example, the RASAs may differ from those shown in the figures. Moreover, the RAHS may be run on different types of computing systems or on computing systems differing substantially from the computing network provided herein. The RAHS and its components may be applied in connection with systems and methods for flow control and data transmission.

In one exemplary embodiment, the RAHS is designed to be compliant with the Telecommunications Management Network (TMN), a set of standards used by network management systems. The TMN provides a network management model defined in International Telecommunications Union Telecommunications (ITU-T) recommendation M.30 and related recommendations. The TMN is intended to form a standard basis for management of advanced networks such as Synchronous Digital Hierarchy (SDH) for fiber-optics in LAN lines and Global System for Mobile communications (GSM) in the cellular communications arts. The TMN specifies a set of standard functions with standard interfaces and makes use of a management network which is separate and distinct from the information transmission network. The TMN also specifies standard network protocols such as the Open Systems Integration Common Management Information Protocol (OSI CMIP). The TMN provides a network management standard which seeks to provide information technology, business and network service management in multi-domain environments.

Further aspects of the invention are described in the following copending patent applications, each of which are assigned to a common assignee: U.S. application Ser. No. 09/365,631, "Method and System for Load-Balanced Data Exchange in Distributed Network-Based Resource Allocation," filed on Aug. 3, 1999, and U.S. application Ser. No. 09/365,636, "Method and System for Maintenance of Global Network Information in a Distributed Network-Based Resource Allocation System," filed Aug. 3, 1999, now U.S. Pat. No. 6,523,065. All of the above U.S. patents and applications are incorporated herein by reference.

Although specific embodiments of, and examples for, the invention are described herein for illustrative purposes, various equivalent modifications are possible within the scope of the invention, as will be recognized by those skilled in the relevant art. The teachings provided herein of the invention can be applied to other distributed resource allocator handling systems, not necessarily the exemplary distributed resource allocator handling system described above. Various exemplary computing systems, and accordingly, various other system configurations can be employed under the invention.

The embodiments of the invention disclosed herein have been discussed with regard to computerized network installations, such as those using large centralized computing systems. However, the invention finds equal applicability in other computing systems, such as small, portable computerized systems and even hand-held computing devices.

These and other changes may be made to the invention in light of the above detailed description. In general, in the following claims, the terms used should not be construed to limit the invention to the specific embodiments disclosed in the specification and the claims, but should be construed to include all distributed resource allocator handling systems that operate under the claims. Accordingly, the invention is not limited by the disclosure, but instead its scope is to be determined entirely by the following claims.

We claim:

1. In a computer network having a distributed resource allocator handling system operating across a plurality of domains within the computer network and managing a plurality of resources, a method for resolving contentions between multiple applications vying for a resource of the plurality of resources, comprising:

receiving a resource request a first time;

determining if the resource request originates from within the distributed resource allocator handling system or from outside the distributed resource allocator handling system;

placing the resource request at a beginning of a queue for the resource if the resource request originates from outside the distributed resource allocator handling system;

determining a priority of the resource request if the resource request originates from inside the distributed resource allocator handling system;

comparing the priority or arrival time of the resource request with priorities or arrival times of queued resource requests in the queue for the resource; and inserting the resource request into a position in the resource queue according to its priority or arrival time.

2. The method recited in claim 1, further comprising:

identifying the arrival time for the resource request if the priority of the resource request matches at least one priority of the queued resource requests; and inserting the resource request into a position in the resource queue s according to its priority and arrival time if the priority of the resource request matches the priority of at least one queued resource.

3. The method recited in claim 1, further comprising: determining if the resource request will be serviced within a quality of service time interval; and generating a quality of service time-out message if the resource request cannot be serviced with the quality of service time interval and if the resource request has not been queued, then deleting the resource request, and if the resource request has been queued, then de-queuing and deleting the resource request.

4. The method recited in claim 1, wherein the resource request comes from within the resource allocator handling system, and further comprising:

determining if the resource request will be serviced within a quality of service time interval;

generating a quality of service time-out message if the resource request cannot be serviced with the quality of service time interval and if the resource request has not been queued, then deleting the resource request, and if the resource request has been queued, then de-queuing and deleting the resource request; and receiving the resource request a second time, wherein the resource request bears an arrival time of the first request.

5. In a distributed resource allocator system operating across a plurality of domains within a computer network to control allocation of a plurality of resources, a system for resolving contentions between multiple applications vying for a resource of the plurality of resources, comprising:

a receiver that receives a request for use of the resource;

a first analyzer that identifies a first characteristic of the resource request and compares the first characteristic of the resource request with the first characteristic of queued resource requests in a queue for the resource determines if the request originates from within the distributed resource allocator handling system or from outside the distributed resource allocator handling system and places the resource request at a beginning of the queue for the resource if the resource request originates from outside the distributed resource allocator handling system, the first analyzer also being configured to determine if the resource request will be serviced within a quality of service time interval and generate a quality of service time-out message if the resource request cannot be serviced within the quality of service time interval and if the resource request has not been queued, then deletes the resource request, and if the resource request has been queued, then de-queues and deletes the resource request; and an inserter that inserts the resource request into a position in the resource queue according to its first characteristic.

6. The system recited in claim 5, further comprising:

a second analyzer that identifies a second characteristic for the resource request if the first characteristic of the resource request matches at least one first characteristic of the queued resource requests, wherein the inserter inserts the resource request into a position in the resource queue according to its first characteristic and second characteristic.

7. The system recited in claim 6 wherein the first characteristic is a resource request priority and the second characteristic is an arrival time.

8. The system recited in claim 5 wherein the first characteristic is a resource request priority.

9. The system recited in claim 5 wherein the first analyzer identifies the first characteristic of the resource request if the resource request originates from inside the distributed resource allocator handling system.

10. The system recited in claim 5 wherein the first analyzer determines if the resource request will be serviced within a qua of service time interval and generates a quality of service time-out message if the resource request cannot be serviced with the quality of service time interval.

11. The system recited in claim 5 wherein the request for a resource is sent from an application program to a resource allocator system agent that includes the receiver.

12. The system recited in claim 5, further comprising a resource database that categorizes and describes each resource of the plurality of resources as being a member of one of two categories that include task-oriented and interaction-oriented resources, a task-oriented resource accepting and executing tasks assigned to it without needing additional interaction with an application program assigning the task, and an interaction-oriented resource requiring a dialogue or interaction with an application program in order to complete a task.

13. The system recited in claim 5, further comprising a resource database that describes each resource of the plurality of resources as having a total capacity for handling a maximum number of tasks or dialogues and a remaining capacity that identifies that portion of the total capacity that has not been allocated to application programs through calls to an application programming interface.

14. The system recited in claim 5, further comprising a resource allocator user agent associated with a resource allocator that comprises the receiver and that transfers function calls from application programs running on one computer over the computer network, and a resource allocator system agent that transfers function calls received over the computer network from the resource allocator user agent to the resource allocator for execution.

15. The system recited in claim 5, further comprising an application programming interface to an application program that interfaces with a resource allocator that comprises the receiver, wherein the application program interface includes a Bind function that causes the resource allocator to establish a session with the application program, a handle indicating the established session returned to the application program by the resource allocator as a result of successfully executing the Bind function, wherein the established session provides to the application program a context in which to make subsequent function calls to the distributed resource allocator handling system.

16. The system recited in claim 5, further comprising an application programming interface to an application program that interfaces with a resource allocator that comprises the receiver, wherein the application program interface includes an authentication mechanism that sends verification information to the resource allocator for verifying the application program.

17. The system recited in claim 16, wherein if the resource allocator verifies the application program, then the resource allocator sends verification information to the application programming interface for verifying the resource allocator.

18. The system recited in claim 5, further comprising an application programming interface that includes a Begin-Allocating-Resource function that causes the resource allocator handling system to make a resource indicated by arguments to the Begin-Allocating-Resource function available for allocation by application programs wherein the Begin-Allocating-Resource function provides the resource request.

19. The system recited in claim 5, further comprising an application programming interface that includes an Allocate-Resource function that causes the resource allocator handling system to allocate a resource indicated by arguments to the Allocate-Resource function to a calling application program for subsequent use by the calling application program.

20. The system recited in claim 5, further comprising an application programming interface that includes a Perform-Task function that causes a resource to perform a task indicated by arguments to the Perform-Task function on behalf of a resource allocator system that calls the function for execution by the resource.

21. In a distributed resource allocator system operating across a plurality of domains within a computer network that controls allocation of a plurality of resources, a method for resolving contentions between multiple applications vying for a resource of the plurality of resources, comprising the computer-implemented steps of:
   receiving a resource request;
   determining if the request originates from outside the distributed resource allocator system; and
   placing the resource request at a beginning of a queue for the resource if the resource request originates from outside the distributed resource allocator system.

22. The computer-implemented method of claim 21, further comprising: identifying a second characteristic for the resource request if the first characteristic of the resource request equals at least one other first characteristic of the queued resource requests; and
   inserting the resource request into a position in the resource queue according to its first characteristic and its second characteristic if the first characteristic of the resource request matches the first characteristic of at least one other queued resource.

23. The computer-implemented method of claim 21, further comprising;
   determining a first characteristic of the resource request if the resource request originates from inside the distributed resource allocator system;
   comparing the first characteristic of the resource request with first characteristics of queued resource requests in a queue for the resource; and
   inserting the resource request into a position in the resource queue according to the first characteristic.

24. The computer-implemented method of claim 23, further comprising:
   determining if the resource request will be serviced within a predetermined quality of service time interval; and
   generating a quality of service time-out message if the resource request cannot be serviced with the predetermined quality of service time interval.

25. The computer-implemented method of claim 21, wherein the resource request comes from within the resource allocator handling system, and further comprising:
   determining if the resource request will be serviced within a quality of service time interval;
   generating a quality of service time-out message if the resource request cannot be serviced with the quality of service time interval and deleting the resource request if the resource request has not been queued, and if the resource request has been queued, then de-queuing and deleting the resource request; and
   receiving the resource request a second time, wherein the resource request bears an arrival time of the resource request for the first time.

26. The computer-implemented method of claim 23 wherein the first characteristic is a request priority.

27. The computer-implemented method of claim 26 wherein the second characteristic is a time of request arrival.

28. The computer-implemented method of claim 23 wherein the request for a resource is sent from an application program to a resource allocator that processes the resource request according to a protocol common to the resource allocator handling system.

29. The computer-implemented method of claim 23 wherein the request for a resource is sent form an application program to a resource allocator in a domain that processes the resource request for the resource, wherein the application program resides in the domain and the resource resides in another domain.

30. The computer-implemented method of claim 23 wherein an application programming interface provides functions that are called by an application program that sends the resource request and executed by a resource allocator that processes the resource request, including fictions that allocate, deallocate, and make use of the resource.

31. The computer-implemented method of claim 23 wherein each resource is categorized and described in a resource database as being a member of one of two categories that include task-oriented and interaction-oriented resources, a task-oriented resource accepting and executing tasks assigned to it in resource requests without needing additional interaction with an application program assigning the task, and an interaction-oriented resource requiring a dialogue or interaction with an application program in order to complete tasks assigned to it in resource requests.

32. The computer-implemented method of claim 23 wherein a resource allocator user agent associated with a resource allocator transfers resource requests from application programs running on one computer over the computer network, and a resource allocator system agent transfers resource requests received over the computer network from the resource allocator user agent to the resource allocator for execution on a resource.

33. The computer-implemented method of claim 23 wherein an application programming interface includes a Begin-Allocating-Resource function that causes the resource allocator handling system to make the resource indicated by arguments to the Begin-Allocating-Resource function available for allocation by application programs.

34. The computer-implemented method of claim 23 wherein an application programming interface includes an Allocate-Resource function that cause the resource allocator handling system to allocate the resource indicated by arguments to the Allocate-Resource function to a calling application program for subsequent use by the calling application program.

35. The computer-implemented method of claim 23 wherein an application programing interface includes a Provide-Next-Task function that causes the resource allocator handling system to provide an indication of a next queued task in the queue to the resource.

36. In a distributed resource allocator system operating across a plurality of domains within a computer network that controls allocation of a plurality of resources, a computer-readable medium holding computer-executable instructions for performing a method for resolving contentions between multiple applications vying for a resource of the plurality of resources, comprising:

receiving a resource request;

determining if the request originates from outside the distributed resource allocator system;

placing the resource request at a beginning of a queue for the resource if the resource request originates from outside the distributed resource allocator system;

determining a priority of the resource request if the resource request originates from inside the distributed resource allocator system;

comparing the priority of the resource request with priorities of queued resource requests in the queue for the resource; and inserting the resource request into the resource queue according to its priority.

37. The computer-readable medium of claim 36, further comprising:

identifying a second characteristic for the resource request if the first characteristic of the resource request equals at least one other first characteristic of the queued resource requests; and inserting the resource request into the resource queue according to its first characteristic and its second characteristic if the first characteristic of the resource request matches the first characteristic of at least one other queued resource.

38. The computer-readable medium of claim 36, further comprising:

determining if the resource request will be serviced within a predetermined quality of service time interval; and generating a quality of service time-out message if the resource request cannot be serviced with the predetermined quality of service time interval.

39. The computer-readable method of claim 36 wherein the first characteristic is a request priority.

40. The computer-readable method of claim 39 wherein the second characteristic is a time of request arrival.

41. The computer-readable medium of claim 36 wherein the first characteristic is an arrival time.

42. The computer-readable medium of claim 36 wherein the request for a resource is sent from an application program to a resource allocator in a domain that processes the resource request for the resource, wherein the application program resides in the domain and the resource resides in another domain.

43. The computer-readable medium of claim 36 wherein an application programming interface provides functions that are called by an application program that sends the resource request and executed by a resource allocator that processes the resource request.

44. The computer-readable medium of claim 36 wherein a resource allocator user agent associated with the resource allocator transfers resource requests from application programs running on one computer over the computer network, and a resource allocator system agent transfers resource requests received over the computer network from the resource allocator user agent to the resource allocator for execution on a resource.

45. The computer-readable medium of claim 36 wherein an application programming interface to an application program interfaces with a resource allocator that comprises the receiver, wherein the application program interface includes an authentication mechanism that sends verification information to the resource allocator for verifying the application program.

46. The system recited in claim 45, further comprising the step of sending verification information by the resource allocator to the application programming interface for verifying the resource allocator if the resource allocator verifies the application program.

47. The computer-readable medium of claim 36 wherein an application programming interface includes an Allocate-Resource function that causes the resource allocator handling system to allocate a resource indicated by arguments to the Allocate-Resource function to a calling application program for subsequent use by the calling application program.

48. The computer-readable medium of claim 36 wherein an application programming interface includes a Perform-Task function that causes a resource to perform a task indicated by arguments to the Perform-Task function behalf of a resource allocator system that calls the function for execution by the resource.

49. In a computer network that interconnects computer resources, a method for exchanging function calls and data between application programs and a distributed resource allocator handling system that coordinates use of the computer resources by the application programs and for exchanging data between components of the distributed resource allocator handling system, wherein the components of the distributed resource allocator handling system include a resource allocator system that execute functions called by the application programs, a resource allocator user agent that transfer function calls from application programs running on one computer over the computer network to a second computer, and a resource allocator system agent that transfer function calls received over the computer network from the resource allocator user agent to the resource allocator system for execution, the method comprising:

calling a function within an application program that is provided by an application programming interface and executed by the resource allocator system;

when the resource allocator system is running on a different computer than that on which the application programs is running, passing the function call from the application program to the resource allocator user agent running on the same computer as that on which the application programs is running, packaging the function call by the resource allocator user agent into a remote access agent protocol message and sending the remote access agent protocol message over the computer network to the resource allocator system agent running on the same computer as than on which the resource allocator system is running, and unpackaging the function call from the received remote access agent protocol by the resource allocator system agent and passing the function call directly from the resource allocator system agent to the resource allocator system;

when the resource allocator system is running on the same computer as that on which the application programs is running, passing the function call directly from the application program to the resource allocator system;

executing the function by the resource allocator system and returning to the application program data provided by the resource allocator system as a result of execution of the function call wherein the function call requires the use of a resource and the resource allocator system resolves contending requests for the resource;

when execution of the function by the resource allocator system causes the resource allocator system to change data stored in a global network information database to describe a current state for the distributed resource allocator handling system and when more than one resource allocator system is running on the computer network, sending a resource allocator system protocol message from the resource allocator system that executed the function call to all remaining resource allocator systems running on the computer network so that all resource allocator systems can accordingly update their respective global network information databases; and when execution of the function by the resource allocator system contends with another function, then resolving the contention by comparing a first characteristic of the function and the another function.

50. The method of claim 49 wherein the application programming interface includes an Allocate-Resource function that causes the resource allocator handling system to allocate a resource indicated by arguments to the Allocate-Resource function to a calling application program for subsequent use by the calling application program.

51. The method of claim 49 wherein the application programming interface includes a Begin-Allocating-Resource function that causes the resource allocator handling system to make a resource indicated by arguments to the Begin-Allocating-Resource function available for allocation by application programs.

* * * * *